United States Patent
Tran et al.

(10) Patent No.: US 11,307,960 B2
(45) Date of Patent: *Apr. 19, 2022

(54) PARAMETER-BASED DEPLOYMENT CONTROL FOR DEPLOYMENT OF DATABASE ARTIFACTS

(71) Applicant: SAP SE, Walldorf (DE)

(72) Inventors: Le-Huan Stefan Tran, Malsch (DE);
Jonathan Bregler, Kraichtal (DE);
Alexander Bunte, Heidelberg (DE);
Arne Harren, Walldorf (DE); Andreas Kellner, Birkenau-Löhrbach (DE);
Daniel Kuntze, Bruchsal (DE);
Vladislav Leonkev, Sandhausen (DE);
Simon Lueders, Walldorf (DE); Volker Sauermann, Dossenheim (DE);
Michael Schnaubelt, Leimen (DE)

(73) Assignee: SAP SE, Walldorf (DE)

(*) Notice: Subject to any disclaimer, the term of this patent is extended or adjusted under 35 U.S.C. 154(b) by 318 days.

This patent is subject to a terminal disclaimer.

(21) Appl. No.: 16/458,535

(22) Filed: Jul. 1, 2019

(65) Prior Publication Data
US 2019/0324884 A1    Oct. 24, 2019

Related U.S. Application Data

(63) Continuation of application No. 15/221,946, filed on Jul. 28, 2016, now Pat. No. 10,353,794.

(Continued)

(51) Int. Cl.
*G06F 16/30* (2019.01)
*G06F 11/34* (2006.01)
(Continued)

(52) U.S. Cl.
CPC ........ *G06F 11/3495* (2013.01); *G06F 11/302* (2013.01); *G06F 11/3466* (2013.01);
(Continued)

(58) Field of Classification Search
CPC ..... G06F 16/9024; G06F 16/21; G06F 16/258
See application file for complete search history.

(56) References Cited

U.S. PATENT DOCUMENTS

| | | | |
|---|---|---|---|
| 2012/0047185 A1* | 2/2012 | Driesen | G06F 8/60 707/803 |
| 2013/0031542 A1* | 1/2013 | Arcilla | G06F 8/60 717/177 |

(Continued)

OTHER PUBLICATIONS

U.S. Appl. No. 14/948,990, filed Nov. 23, 2015, 99 pages.
(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

Parameter-based deployment control for database objects is provided, in which processes for deploying database artifacts into a database as database objects are implemented. Many different techniques may be used in executing such deployment processes, including whether and how to combine various deployment-related jobs, identify/record/assess/correct potential errors, govern or instruct artifact conversion operations, or generally manage available resources with respect to executing the deployment(s) efficiently. By providing for selectable parameter values that are executed in an efficient, e.g., hierarchical, manner, deployment procedures may be implemented in a highly efficient and customizable manner.

20 Claims, 9 Drawing Sheets

Related U.S. Application Data

(60) Provisional application No. 62/333,434, filed on May 9, 2016.

(51) Int. Cl.
*G06F 16/21* (2019.01)
*G06F 16/25* (2019.01)
*G06F 16/28* (2019.01)
*G06F 11/30* (2006.01)
*G06F 11/36* (2006.01)

(52) U.S. Cl.
CPC ...... *G06F 11/3476* (2013.01); *G06F 11/3636* (2013.01); *G06F 16/211* (2019.01); *G06F 16/217* (2019.01); *G06F 16/258* (2019.01); *G06F 16/289* (2019.01); *G06F 2201/865* (2013.01)

(56) References Cited

U.S. PATENT DOCUMENTS

| | | | |
|---|---|---|---|
| 2015/0212925 A1* | 7/2015 | Granshaw | G06F 11/3636 717/128 |
| 2017/0163518 A1* | 6/2017 | Dube | H04L 41/5054 |

OTHER PUBLICATIONS

U.S. Appl. No. 14/949,128, filed Nov. 23, 2015, 90 pages.
U.S. Appl. No. 14/949,189, filed Nov. 23, 2015, 93 pages.
U.S. Appl. No. 14/949,256, filed Nov. 23, 2015, 88 pages.

* cited by examiner

PARAMETER-BASED DEPLOYMENT CONTROL FOR DEPLOYMENT OF DATABASE ARTIFACTS

CLAIM OF PRIORITY

This application claims priority under 35 USC § 120 to, and is a continuation of U.S. patent application Ser. No. 15/221,946 filed Jul. 28, 2016; entitled PARAMETER-BASED DEPLOYMENT CONTROL FOR DEPLOYMENT OF DATABASE ARTIFICACTS, which claims priority under 35 USC § 119, and is a non-provisional of U.S. Provisional Application No. 62/333,434, filed May 9, 2016, entitled PARAMETER HIERARCHY FOR DEPLOYMENT OF DATABASE ARTIFACTS, both of which are incorporated herein by reference in their entirety.

BACKGROUND

Large database systems, such as enterprise resource planning ("ERP") systems, and customer relationship management ("CRM") systems, can include database objects that store and organize data, as well as database objects for accessing the data. For example, in some database systems a database object may include a table, an index, and a view, as well as a procedure for accessing one or more tables, importing data into one or more tables, or a calculation view that manipulates the data in one or more tables. One example of such a database is the High-Performance Analytic Appliance ("HANA"), which is a column-oriented, in-memory database appliance available from SAP SE, Walldorf, Germany. HANA supports both column-based and row-based storage. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may develop some of the database objects themselves. Such a process may include developing design-time artifacts that are deployed to the database as run-time objects. For example, the developer, and/or a database administrator, may at design time develop or revise one or more database artifacts that are then deployed to the database as a run-time database object. The deployment of a database artifact may result in one or more database objects and the deployment of multiple database artifacts can result in one database object. Thus the relationship between development database artifacts and run-time database objects may be one-to-one, one-to-many, many-to-one, or many-to-many.

Each developer and database administrator may deploy one or more database artifacts in a container, which is a separate database schema and acts as a sandbox to insulate database objects from deployment and run-time errors of other containers. A container may be generated and maintained for specific application tasks and may, thus, represent deployment actions and data elements related to a real-world or conceptual object, such as a sales order, an invoice, a schedule, etc. For example, a container may be generated for sales orders and may include instructions for performing specific tasks on the data related to sales orders, as well as instructions defining the data itself. Containers can be user-specific or group specific. Containers may access other containers via a private synonym, if the other container enables such access. Containers may be complex, with hundreds or even thousands of database artifacts, making manual deployment of the artifacts difficult and time consuming.

SUMMARY

Parameter-based deployment control for database objects is provided, in which processes for deploying database artifacts into a database as database objects are implemented in a flexible, customizable manner. Many different techniques may be used in executing such deployment processes, including whether and how to combine various deployment-related jobs, identify/record/assess/correct potential errors, govern or instruct artifact conversion operations, or generally manage available resources with respect to executing the deployment(s) efficiently. The deployment processes may be optimized including allowing users to select from available deployment parameter values. Accordingly, for example, for a database artifact specifying a database object to be deployed within a database system using a plurality of deployment procedures, a user may provide a selectable parameter value for a deployment procedure parameter for one of the deployment procedures that includes the database artifact. The selected parameter value may have varying types or levels of applicability (e.g., for a single artifact, a single type of artifact, or for all artifacts).

DETAILED DESCRIPTION

Figure 1:
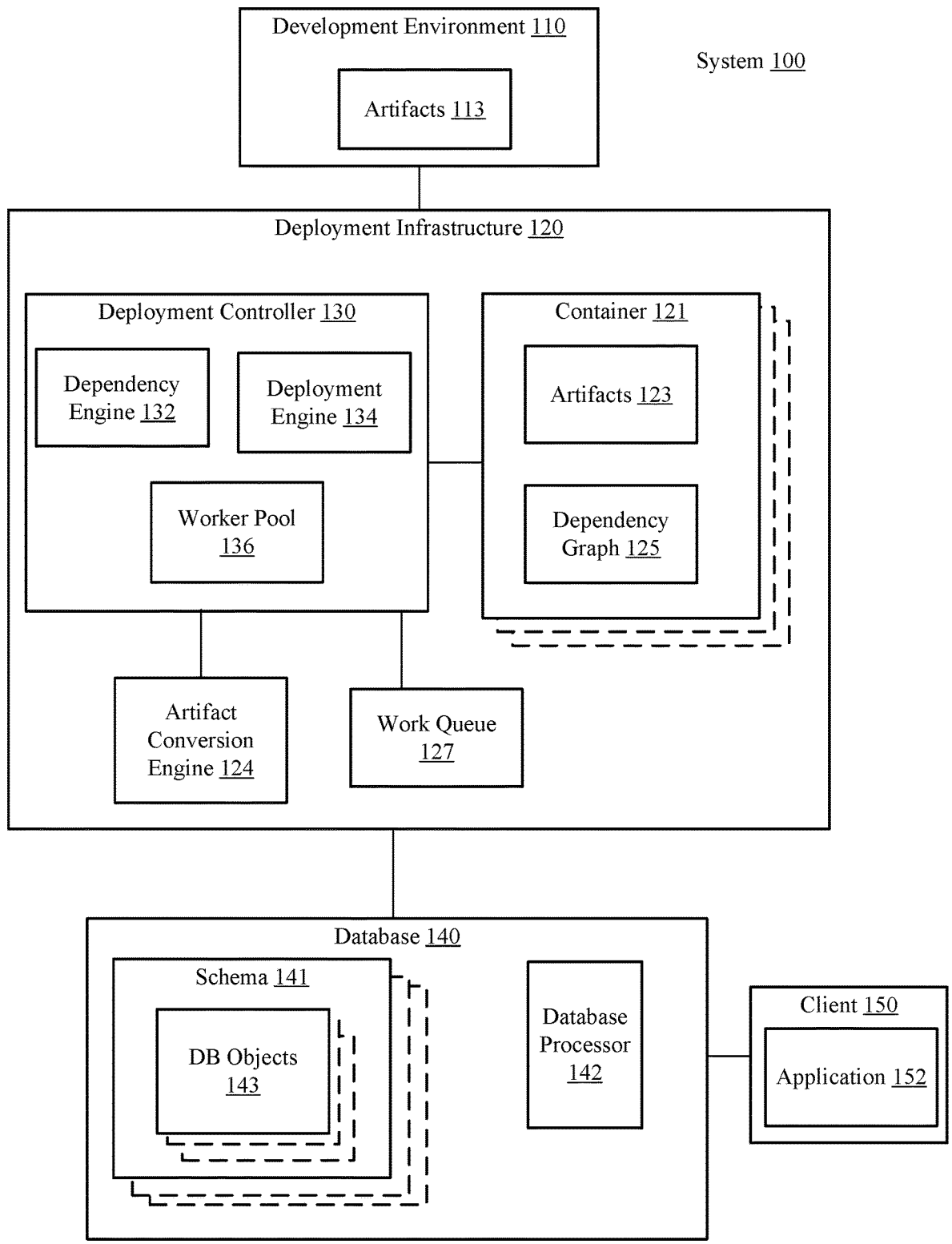
FIG. 1 is a block diagram of a system for deployment of database artifacts, consistent with disclosed implementations.

A deployment infrastructure system focuses on deployment aspects and addresses both development and modeling scenarios for a database. Implementations may handle development and modeling of database artifacts for deployment into the database as run-time database objects. Artifacts can include things like tables, views, indexes, core data services ("CDS"), calculation views, procedures, and so forth. In some implementations the deployment infrastructure system does not support non-database artifacts like JavaScript programs, OData artifacts, etc. Such artifacts can may be handled by an application layer. An example of an application layer is extended services ("XSA") for a HANA database.

In some implementations, deployment of database objects via the deployment infrastructure is based on a container model where each container corresponds to a database schema. Containers can be used for multiple deployments of the same database artifacts, and for development sandboxes. Containers may be isolated against each other by database means, e.g. each database schema with its deployed database objects is owned by a per-schema technical user. The technical user may be separate from a container owner to allow the separation of privileges for deployment and runtime access to deployed database objects. Thus, security aspects for deployment need only to consider technical users. A technical user can be for a specific container and may represent a user used by the deployment infrastructure, e.g., deployment infrastructure 120 of FIG. 1, as discussed below, to communicate with the database, e.g., database 140 of FIG. 1, and to deploy the artifacts as database objects into the database. A technical user is not a developer. Technical users decouple ownership from developers, i.e., the created database objects are owned by a technical user. Technical users may be used internally by the deployment infrastructure 120 and the database 140 and may be created as restricted database users, who do not have any default privileges. Thus, by default cross-container access at the database level may not be possible; but can be granted via database privileges. In addition to the schema-based containers, the deployment infrastructure system may also use database schemata to isolate its metadata, for example separating definition of artifacts from the deployed database objects.

In some implementations, some database objects are written in a schema-free way, or in other words, without explicit schema references. This allows deployment of the same database objects into different containers because database objects reference other database objects only via object names without schema reference. The containers may be created by users who have the privilege to call a specific SQL API function for creating a container. Such a privilege can be granted by a database administrator. Database objects deployed using the deployment infrastructure in a container can thus be deployed by any user who has the privilege to call a specific SQL API function of the desired container for deploying design-time artifacts. In such implementations, references to schema-external objects may be created via synonyms (or table links in case of Zero-Downtime Maintenance ("ZDM")) that are bound during deployment. The synonyms (or table links) provide schema-local names for the schema-external objects. Privileges on these schema-external objects can be explicitly granted to the container's technical user, e.g. SELECT-WITH-GRANT-OPTION privileges on schema-external ERP tables.

Deployment Infrastructure System

FIG. 1 illustrates a block diagram of an example deployment infrastructure system 100, according to disclosed implementations. The system 100 may be used to deploy design-time artifacts to create run-time objects that can be accessed by applications. The system 100 may include a database 140, a deployment infrastructure 120, and a development environment client 110. The development environment client 110 may include functionality from one or more development tools, such as a deployment infrastructure client, an extended services development infrastructure component, and an extended services deployment component. The development environment client 110 may be communicatively coupled with the deployment infrastructure 120. In some implementations, the development environment client 110 may access the deployment infrastructure 120 via a proxy (not shown) that insulates the deployment infrastructure 120 from direct access by the development environment client 110. In some implementations, the deployment infrastructure 120, the proxy, and the database 140 may be part of a database cluster. Deployment-related activities, such as staging of files, triggering of real deployment into a single container, etc., can be performed by a dedicated technical deployment user. As indicated above, the technical deployment user of the container can be different from the technical runtime user of the schema to allow separation of privileges for deployment and/or runtime access to the deployed database objects.

The development environment client 110 may enable the generation and maintenance (revision) of design-time artifacts 113. The design-time artifacts specify a definition of one or more database objects in a declarative way. In other words, the design-time artifacts represent the target state of the database objects rather than using the imperative CREATE, ALTER, and DROP statements, which are conventionally used to generate database objects. The use of declarative statements for artifacts 113 not only enables the creation of run-time database objects, but also facilitates modeling a networked set of artifacts, such as tables, sequences, views, procedures, functions, data flows, etc. as design-time artifacts. In some implementations, not all artifacts have a one-to-one relationship to a SQL statement. For example, calculation views may result in multiple database objects and table data (e.g., a table import artifact) might be provided via CSV text files or even binary files which do not correspond to SQL. Thus a single artifact may result in deployment of one or multiple database objects, and multiple artifacts can result in deployment of a single database object. The database objects deployed from an artifact may be controlled by the artifact conversion engine 124. The design-time artifacts simplify a dependency-based deployment, re-deployment, and un-deployment, and facilitate lifecycle management aspects. For example, using design-time artifacts enables separation of the steps of 1) uploading the artifacts into deployment infrastructure (staging), and 2) deploying the artifacts to the database. Artifacts 113 also simplify incremental deployment because only modified design-time artifacts are uploaded and deployed rather than every artifact in the container.

When a user of the development infrastructure, e.g., a developer, is ready to deploy the design-time artifacts 113 from the development environment client 110 to the deployment infrastructure 120, the developer may create a container 121 for the artifacts to reside in. A container 121 represents a database schema 141 in the database 140 and is a work space that can be owned and accessed by a single user or a group of users (e.g., a single developer or a group of developers). The container 121 includes container metadata, such as companion containers (i.e. companion schemata), technical users authorized to access the schema, etc. Companion containers are other containers that have database artifacts the container wants to access. A synonym in the container 121 enables the container 121 to access artifacts in the other container, i.e., the companion container. Metadata for a container 121 may, thus, identify run-time user privileges (e.g., for technical users of other containers), a container owner, or dependencies between design-time artifacts.

In some implementations, database objects are deployed in schema 141, which corresponds to a container. Thus, each container 121 has a corresponding schema 141. Each container 121 also may include other components such as a metadata schema, which may contain items such as a version number. In some implementations, a single deployment only operates on a single container 121 and the container boundary is a deployment boundary. In other words, affected database objects 143 inside other database schemata 141 (e.g., schemata that do not correspond with the container being deployed) are not re-deployed and deployment does not fail if database objects inside other schemata break. The container-based deployment of the deployment infrastructure system 100 enables the system to use transactional deployment. In other words, the deployment infrastructure system 100 may perform deployment modification of database objects 143, including DDL and DML operations and all re-deployments of affected objects, inside a single database transaction. In some implementations, sub-transactions do not exist. In other implementations, sub-transactions may be used for further optimization, e.g., to commit some parts of the deployment. Thus, the system 100 does not need compensation operations in case of rollbacks because these are handled by the database as part of the transaction management. As indicated above, some database objects 143 may be deployed outside of a schema 141, e.g., ERP objects that are created beforehand outside the container schema, e.g., they have been manually created in another schema or deployed in another container.

The user creating the container 121 may upload the artifacts 113 from the development environment client 110 to the deployment infrastructure 120, which adds artifacts 123 to the container 121. Once the artifacts 123 are loaded into the container 121 a user may begin the deployment of the artifacts 123 within that container 121. In some implementations the deployment may be initiated via a make or deployment process. The deployment process may be directed by a deployment controller 130 of the deployment infrastructure 120. The deployment controller 130 may be instructions stored in one or more memories that, when executed by one or more processors formed in a substrate, cause the deployment infrastructure to perform certain operations. The deployment controller 130 may include one or more engines, which also may be referred to as "build plug-ins", that take the artifacts 123 in the container 121, determine dependencies for the artifacts 123, determine an order of deployment for the artifacts 123, and initiate generation of appropriate schema 141 and database objects 143 in accordance with existing authorization and syntactical requirements. In other words, the deployment controller 130 accomplishes deployment of the artifacts 123 in the container 121 in an automatic and transactional manner, providing error messages as appropriate, and eliminating the need for any user to manually determine the proper order of deployment for the artifacts 123.

Figure 3:
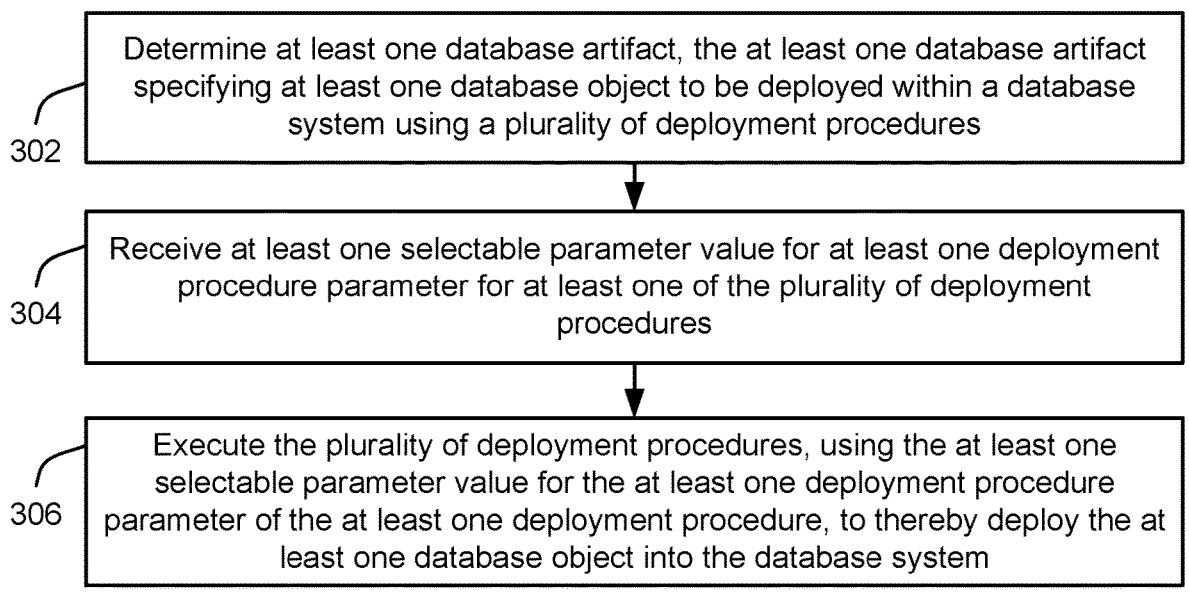
FIG. 3 is a flowchart illustrating example operations of the system 200 of FIG. 2.

In some implementations, the deployment controller 130 may include a dependency engine 132. The dependency engine 132 may oversee generation of a dependency graph 125 for the artifacts 123 in the container 121. The dependency graph 125 represents a proper order of deployment for the artifacts 123. In the dependency graph 125 a root node may be an artifact that is itself not dependent on any other artifact. It is possible for the dependency graph 125 to have multiple root nodes. FIG. 3 illustrates an example dependency graph. In FIG. 3, artifact A is a root node because artifact 4 is not dependent on any other artifact (e.g., has no incoming edges). Although FIG. 3 is depicted with incoming edges representing a dependency, some implementations may use outgoing edges rather than incoming edges to represent a dependency in the dependency graph 125. The dependency engine 132 may generate the dependency graph 125 by generating a node for each artifact 123 in the container 121 and extracting dependency information from the declarative statements in the artifacts 123 themselves. In some implementations, the dependency engine 132 may update the dependency graph 125 by adding additional dependency edges, also referred to as push-forward edges. In some implementations, such additional push-forward edges may be added by an artifact conversion engine 124.

In some implementations, the dependency engine 132 may build the dependency graph 125 via phases, including an expand phase, a precompile phase, a merge phase and a build phase. In the expand phase the system may expand complex objects into separate artifacts. For example, a synonym artifact may be expanded into a synonym artifact and a configuration artifact. The configuration artifact is of a different artifact type than the synonym artifact. Thus an expand phase enables one artifact in artifacts 113 to be deployed as multiple database objects 143. In the precompile stage the system may determine dependencies in each artifact. In some implementations, the precompile may generate two lists for each artifact—a provides list and a requires list—which are used to build a dependency graph. In the merge phase the system may combine two artifacts into one artifact e.g., merging an optional synonym configuration artifact and a synonym artifact into a synonym artifact with an explicit configuration. As another example, if a synonym has a default configuration artifact and an explicit configuration, the merge phase may result in the combination of the two artifacts into one combined configuration artifact. Thus, the merge phase may enable two artifacts defined in artifacts 113 (or generated as part of the expand phase) to be implemented as one database object 143. In some implementations, the system may perform a precompile phase after the merge phase and after the expand phase. In some implementations, the merge phase may occur after the expand phase. In the build phase the system may build the dependency graph with the backward edge count and push-forward edges using the information generated during the precompile phase(s). Deployment of the artifacts may take place during a walk-graph stage. In some implementations, each stage can utilize parallel processing.

The deployment controller 130 may also include a deployment engine 134. The deployment engine 134 may direct the deployment of artifacts 123 to database objects 143 using the dependency graph 125. The deployment controller 130 may use the dependency graph 125 to calculate the order in which the database objects need to be created, and to detect missing and/or required objects, as well as to find and report attempted unauthorized access of artifacts outside the container (e.g., via synonyms). In addition, the deployment engine 134 may use dependencies to re-deploy database objects that are affected by newly deployed or modified objects.

The deployment controller 130 (e.g., the dependency engine 132 and deployment engine 134) may work with an artifact conversion engine 124 in deployment of artifacts 123. In some implementations, the interpretation of artifacts including the extraction of dependencies and the steps taken to implement a target-state-based deployment of the artifacts is done by the artifact conversion engine 124, which includes deployment directives for each artifact type. In other words, the artifact conversion engine 124 may be formed from instructions, e.g., a build plugin, for a table artifact type, a plugin for a view artifact type, a plugin for a table import artifact type, etc. The plug-ins may be different files, different procedures, or just different portions of the artifact conversion engine 124. Each build plug-in may be a program or piece of code that executes the various build phases (precompile, merge, and expand) and transforms a design-time artifact into a run-time database object. In some implementations, an application developer may provide the plug-in for an artifact type. In some implementations, the artifact conversion engine 124 may have access to a deployment container 121 via a SQL-based API only. Commands that the artifact conversion engine 124 needs for creating/altering/dropping a database object may be available at the SQL layer of the database 140. These SQL commands may take the database security constraints into account. In transactional deployment, the DDL and DML statements may run inside a single database transaction in non-auto-commit mode. In some implementations, the database 140 may be insulated from the artifact conversion engine 124. For example, the artifact conversion engine 124 may issue commands via the deployment controller 130 to the database 140 rather than directly to the database 140. Such implementations insulate the database 140 from the artifact conversion engine 124 by having the deployment controller 130 (or another controller, such as database processor 142) check commands for authentication or syntax errors prior to executing the commands.

In some implementations, the deployment controller 130 may improve the functioning of the system 100 by using parallel processing to deploy the artifacts 123. In other words, the deployment controller 130 may improve the processing of the system 100 by speeding up the deployment of the artifacts 123. When the container 121 includes hundreds or thousands or artifacts 123, parallel processing may result in a substantial reduction in the deployment time. When the deployment controller 130 includes parallel processing, the deployment controller 130 may start one or more worker threads in a worker pool 136. The worker pool 136 represents the worker threads available for deploying the container 121. In other words, the worker threads in the worker pool 136 are available for deploying the artifacts 123 of the container 121. The deployment engine 134 may place artifacts 123 ready for immediate deployment (meaning any artifacts 123 not waiting on a dependency to be deployed) on the work queue 127. The worker threads in worker pool 136 may pull an artifact from the work queue 127 and deploy that artifact, e.g., initiating generation of one or more database objects 143. When all artifacts 123 have been deployed (or the transaction has failed and rolled back), the deployment controller 130 may close the work threads.

The system may also include database 140. The database 140 may be a database server that supports a variety of conventional database object types, such as tables, views, indexes, etc., as well as non-conventional database object types, such as procedures, calculation views, synonyms, etc. In some implementations, the database 140 is an in-memory column-oriented database, such as HANA, where HANA supports both column-based and row-based storage. The database 140 may include various database processors 142, which can include a database processor that communicates with an optional deployment infrastructure proxy engine 144, a structured query language ("SQL") processor, etc. In some implementations, the development environment client 110 may use the proxy engine 144 to access the deployment infrastructure 120. In some implementations, the proxy engine 144 may periodically query the deployment infrastructure 120 to determine if the deployment infrastructure 120 is still running. If the proxy engine 144 determines the deployment infrastructure 120 has crashed, it may update a status flag for any open database connections to false, indicating that the transactions (e.g. the make requests) running on those connections have finished and may also update a status indicating the transactions were not successful.

In some implementations, the deployment controller 130 can communicate with the database processor 142 via an internal application programming interface (e.g., HANA's internal EAPI Thin Layer SQL client) on a new database transaction. This new transaction may not be related to the database transaction in which the deployment infrastructure command is sent to the database 140. The SQL communication from deployment infrastructure 120 towards the database 140 can be a trusted communication which can allow the deployment infrastructure 120 to execute SQL statements on behalf of different technical users inside a single database transaction in order to implement different security features at the database layer.

In some implementations, the system 100 can provide an SQL-based API for the deployment infrastructure 120 that can be accessed via a standard SQL connection, where the API can be exposed at the SQL layer. In some implementations, the system 100 may include a higher-level privileged container management API that allows the creation and deletion of schema-based containers and a container-level deployment API that allows applications and/or lifecycle management tools to deploy/un-deploy artifacts within a container. In some implementations, the system may keep the deployment controller 130 and the artifact conversion engine 124 isolated in its own operation system process.

In some implementations, the database 140 may include a proxy engine 144. The proxy engine 144 may handle communications between the deployment controller 130 and the database processor 142. For the purposes of decoupling, the deployment infrastructure 120 can provide database procedures for its APIs. Communication from the database 140 towards the deployment infrastructure 120 can be provided via a proxy library that can be loaded into the database 140. The proxy library may include a status table that has an entry for each make process. The proxy engine 144 can implement database procedures and/or client-side of a deployment infrastructure network protocol. All incoming requests can be routed to the deployment infrastructure process using this network protocol.

In some implementations, the deployment infrastructure can be constrained by at least one of the following deployment architectural boundaries: database services, application programming interfaces, and technical users. For example, some database services may not allow access to database objects 143 by other schema. As another example, some technical users may not be granted access while others may be granted access to a schema 141. The database processor 142 may check these deploy-time conditions and issue an error if an attempt is made to violate a deployment boundary. In some implementations, the deployment infrastructure 120 may create the required metadata, database users, and/or database roles inside the database 140 to support the database service instance.

Although illustrated in FIG. 1 as separate from the database 140, in some implementations, the deployment infrastructure 120 can also be included in the database 140 or included in a database cluster that also includes the database 140.

Figure 2:
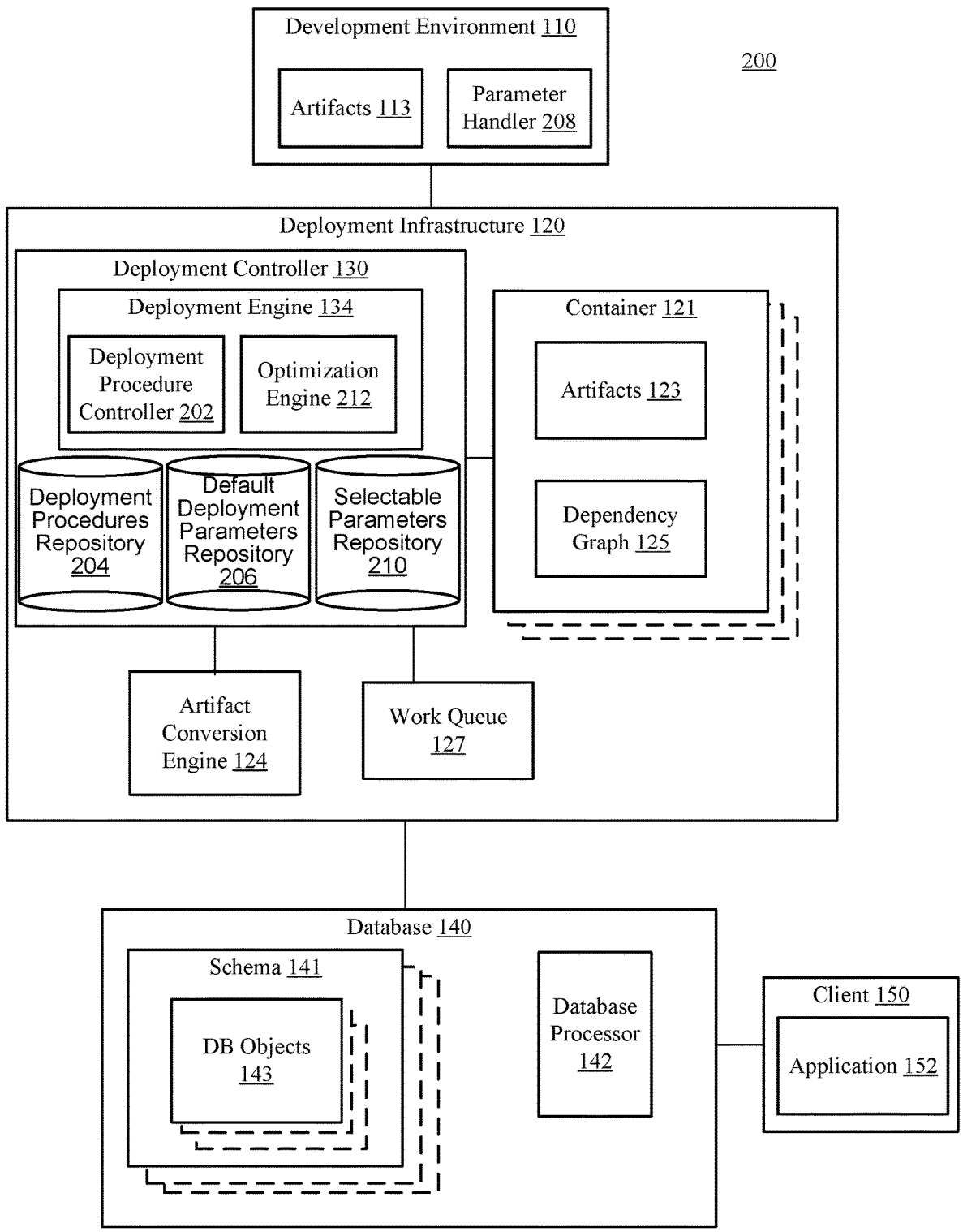
FIG. 2 is a block diagram of a system for parameter based deployment control for database objects.

FIG. 2 is a block diagram of a system 200 for parameter based deployment control for database objects. More specifically, FIG. 2 illustrates an example implementation of the system 100 of FIG. 1 in which processes for deploying the artifacts 113/123 into the database 140 as database objects 143 may be optimized in a highly efficient and customizable manner. As illustrated, FIG. 2 demonstrates a more detailed view of an implementation of the deployment controller 130 including an illustration of the deployment engine 134 as including, or having access to, components 202, 204, 206, 210, and 212, while also illustrating the development environment 110 as including component 208, all of which are described in detail, below.

Many different techniques may be used by the deployment engine 134 in executing the deployment of the database objects 143 into the database 140. For example, the deployment engine 134 may be configured to determine whether and how to combine various deployment-related jobs, identify/record/assess/correct potential errors, govern or instruct operations of the artifact conversion engine 124 and/or the container 121, and generally manage available resources with respect to executing the deployment efficiently.

In order to provide specific scenarios for the sake of explanation, it may occur, for example, that multiple object deployments may be associated with access to the same or overlapping data, so that it becomes necessary to manage the data access in a manner that eliminates potentially conflicting updates to the same data. For example, access to certain data may be locked during deployment of a particular container or database object (i.e., for exclusive access to the locked data by the particular container/database object), which may necessitate a delay in deploying another container or database object, until the exclusive data access of the first container/database object is released.

In another example, it may occur that the deployment engine 134 is configured to execute jobs or other interactions with the database 140 in batches. That is, for example, a batch of deployment-related commands may be provided to the database 140 in a single transmission. An optimal size and/or timing of each such batch may vary in various deployment scenarios. Similarly, operations of the artifact conversion engine 124 may be batched, as well.

In order to execute these and various other types of deployment procedures, the deployment engine 134 may include, or utilize, a deployment procedure controller 202, which may be configured to access, parameterize, and execute a plurality of deployment procedures stored within a deployment procedure repository 204. In particular, in order to execute relevant deployment procedures for a particular deployment(s) being conducted, the deployment procedure controller 202 may access default deployment parameters from a default deployment parameter repository 206, as illustrated in the example of FIG. 2.

In other words, during default deployment operations, the deployment procedure controller 202 may initially determine, from the existing, relevant context of the deployment, all necessary deployment procedures to be retrieved from the deployment procedure repository 204. For each such deployment procedure, the deployment procedure controller 202 may then identify values for any specific deployment parameters required for execution of the retrieved deployment procedures, by accessing such values from the default deployment parameter repository 206. Accordingly, the thus-parameterized deployment procedures may be executed by the deployment engine 134, in order to thereby deploy the artifacts 113/123 into the database 140 as the database objects 143, as already referenced and described above in detail with respect to FIG. 1. Of course, these techniques are just examples; in additional or alternative implementations, for instance, a given deployment procedure may be stored together with its corresponding (default) parameter value(s).

In order to provide additional capabilities for the customization, optimization, or efficiency of deployment procedures of the deployment engine 134, the system 200 provides a developer using the development environment 110 with an ability to parameterize deployment procedures in a desired manner. In particular, as illustrated in the example of FIG. 2, the development environment 110 may be configured to include a parameter handler 208 that is configured to provide a developer using the development environment 110 with an ability to specify additional or alternative parameter values to be used in specified deployment operations of the deployment engine 134 (e.g., in the place of default values for corresponding default parameters).

For example, the parameter handler 208 may be configured to utilize any conventional or future technique for enabling a developer using the development environment 110 to enter desired or available parameter values. For example, drop-down menus, or text entry fields for receiving specified parameter values may be provided in conjunction with other operations of the development environment 110 associated with specifying deploy-time conditions.

In the example of FIG. 2, the parameter handler 208 is illustrated as being provided at the development environment 110. However, as referenced above with respect to FIG. 1, the various components of FIG. 2 may be implemented partially or completely within different parts of the architecture illustrated in the example of FIG. 2. For example, it will be apparent that the parameter handler 208 may be implemented partially or completely in conjunction with the deployment infrastructure 120.

Further in FIG. 2, an optimization engine 212 may be configured to interact with the parameter handler 208 and enable the types of deployment customizations and optimizations referenced herein (in this regard, it will be appreciated that the term optimization need not refer to a literal or singular optimal value for a particular deployment scenario, but rather also includes and refers to a value(s) that is a best-known value available to a developer, or determined by an automated technique for parameter value selection). For example, the optimization engine 212 may be configured to determine whether and how various ones of the deployment procedures within the deployment procedure repository 204 will be available for parameterization, through the use of the parameter handler 208. For example, the optimization engine 212 may interact with the parameter handler 208 to facilitate various types of graphical user interface (GUI) elements that may be used to identify available parameters (e.g., batch size parameters) for customization, and to receive desired parameter values in conjunction therewith.

Upon receipt of such parameter values by way of the parameter handler 208, the optimization engine 212 may proceed to update a selectable parameters repository 210. For example, the optimization engine 212 may create a parameter table storing the specified, selected parameter values, as described in more detail below. Then, during an actual object deployment, the deployment procedure controller 202 may interact with the optimization engine 212 to obtain necessary parameters, and to call and execute corresponding, relevant procedures of the deployment procedures stored in the deployment procedure repository 204. In this way, deployment operations of the system 200 may be conducted in a flexible and efficient manner.

In additional or alternative implementations, the optimization engine 212 may be configured in a manner designed to provide additional aspects of flexibility and optimization in operations of the deployment engine 134. For example, the optimization engine 212 may characterize received parameter values with respect to a type or aspect of each received parameter. For example, received parameter values may be specified as being applicable to a single artifact, to a type or class of artifact, to all artifacts to be deployed, or to all but a specified subset of artifacts to be deployed. In these and similar scenarios, the various parameter values may be stored, accessed, and utilized quickly and efficiently.

Related example operations are described in more detail below with respect to FIG. 5, including an ability of the optimization engine 212 to select available parameter values in a hierarchical manner, e.g., based on relative levels of applicability of the various parameter values (e.g., from most-narrowly applicable to most-widely applicable within the deployment). As also described in more detail below with respect to FIG. 5, in scenarios in which the optimization engine 212 determines that there is no available, corresponding parameter value within the optimization parameters repository 210, the corresponding default value for the parameter in question may be retrieved from the default deployment parameters repository 206.

FIG. 3 is a flowchart 300 illustrating example operations of the system 200 of FIG. 2. In the example of FIG. 3, operations 302, 304, 306 are illustrated as separate, sequential operations. However, in various implementations, additional or alternative operations or sub-operations may be included, and/or one or more operations or sub-operations may be omitted. In all such implementations, it may occur that any two or more such operations or sub-operations may be executed in a partially or completely overlapping or parallel manner, or in a nested, iterative, looped, or branched fashion.

In the example of FIG. 3, at least one database artifact may be determined, the at least one database artifact specifying at least one database object to be deployed within a database system using a plurality of deployment procedures (302). For example, the deployment controller 130, e.g., the deployment engine 134, may receive one or more of the artifacts 113 by way of the development environment 110, as already described above with respect to FIG. 1. Of course, as such, it will be appreciated that the various elements and aspects described with respect to FIG. 1 may also be applicable in the context of FIG. 2, including, e.g., use of the dependency engine 132 to determine and verify appropriate dependencies between and among received artifacts, as well as use of the container 121 in receiving and utilizing the artifacts 123.

As described above with respect to FIG. 2, the deployment procedure controller 202 is configured to utilize specific deployment procedures selected from the deployment procedure repository 204 for the purpose of deploying the various database objects 143 into the database 140. As will be appreciated from the above description, the deployment process may include use of the artifact conversion engine 124 (or multiple instances thereof) to execute conversion of the artifacts 113/123 into the various corresponding database objects 143, and in executing the deployment of the converted database objects into the database 140, all in conjunction with parameterized instances of selected/relevant ones of the deployment procedures within the deployment procedure repository 204.

At least one selectable parameter value may be received for at least one deployment procedure parameter for at least one of the plurality of deployment procedures (304). For example, the optimization engine 212 may receive such a selectable parameter value by way of the parameter handler 208. Then, in example implementations, the optimization engine 212 may proceed to make one or more parameter tables within the selectable parameters repository 210. Of course, in some scenarios, for some parameters, it may occur that no selectable parameter value is received, in which case the default value may be used as described herein.

In various implementations, as referenced above and described in detail below with respect to FIGS. 4 and 5, the optimization engine 212 may store specific parameter values in conjunction with a characterization(s) of types of applicability thereof. For example, the optimization engine 212 may store a particular parameter value as applying to a specific artifact, a specific type of artifact, or to all artifacts. In various implementations, such characterizations of applicability of received and stored parameter values may be received by way of the parameter handler 208 in conjunction with receipt of the parameter values themselves, and/or may be automatically inferred or determined using the optimization engine 212.

The plurality of deployment procedures may then be executed, using the at least one selectable parameter value for the at least one deployment procedure parameter of the at least one deployment procedure, to thereby deploy the at least one database object into the database system (306). For example, the deployment procedure controller 202 may receive a specific selectable parameter value from the optimization engine 212, and/or directly from the optimization parameter depository 210. The deployment procedure controller 202, in selecting appropriate, relevant ones of the deployment procedures within the deployment procedure repository 204, may proceed to utilize the retrieved parameter value within a corresponding deployment procedure, to thereby deploy the database objects 143 into the database 140. As described, in utilizing the received, selectable parameter values, the deployment procedure controller 202 may attempt to utilize a particular, selectable parameter value based on a type (e.g., level of applicability) thereof, or may use a corresponding default value from the default deployment procedure repository 208 in circumstances in which no corresponding selectable parameter values are available.

Figure 4:
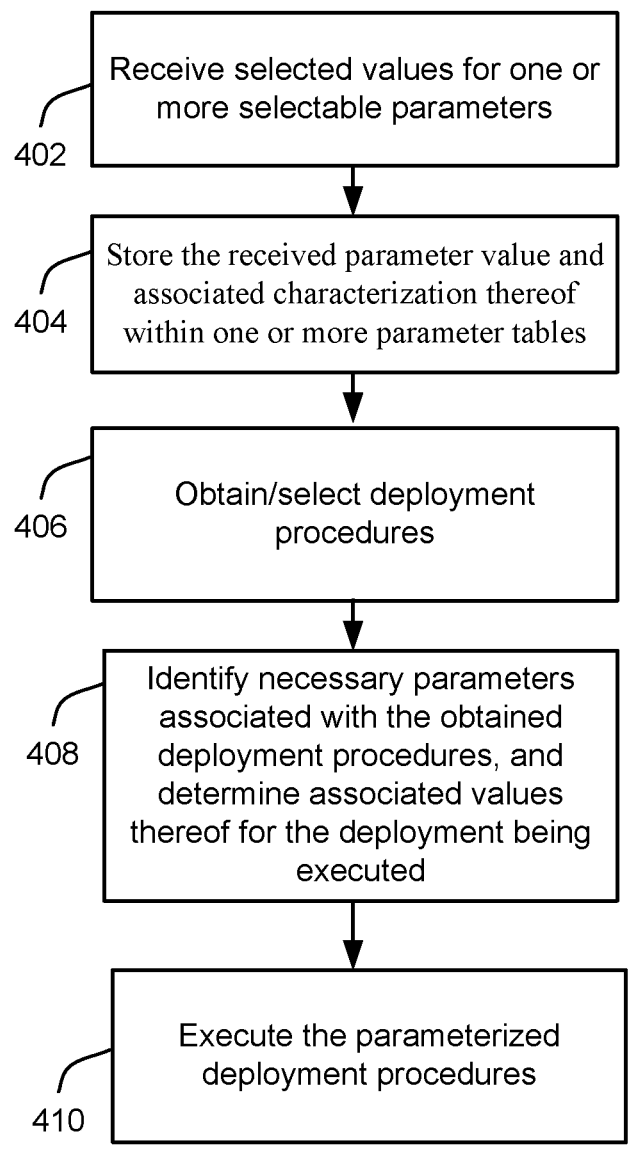
FIG. 4 is a flowchart illustrating more detailed example implementations of the system of FIG. 2.
Figure 5:
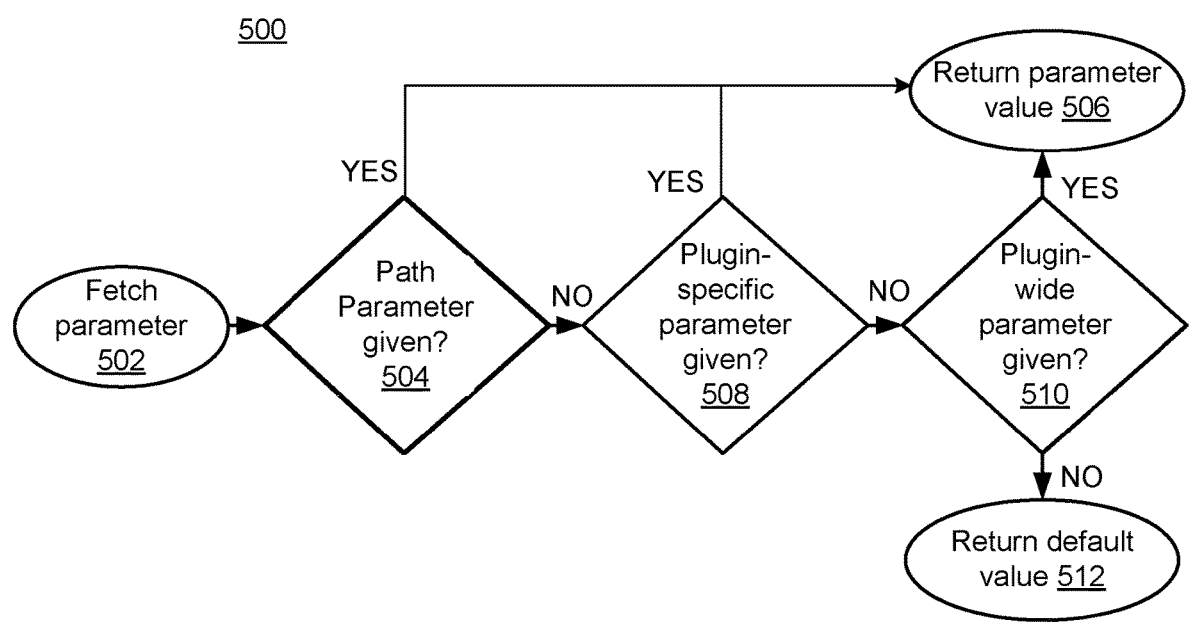
FIG. 5 is a flowchart illustrating an example implementation of the system of FIG. 2 in which parameter values are utilized based on a hierarchical parameter type.

FIG. 4 and FIG. 5 are flowcharts illustrating more detailed example implementations of the system 200 of FIG. 2. More specifically, FIGS. 4 and 5 are flowcharts illustrating example implementations in which received values for the selectable optimization parameters are evaluated in a hierarchical manner, based on a class or type of each received parameter value.

In the example of FIG. 4, selected values for one or more selectable parameters are received by way of the parameter handler 208, in conjunction with class or type information characterizing each received parameter/value (402). For example, in some implementations, the characterization of a type of parameter being selected may be made explicit to a developer using the development environment 110, so that the developer may make a conscious choice regarding a manner and extent to which the selected value is applied within the system 200.

For example, when the developer selects a batch size governing an extent to which database access procedures are batched, the developer also may be provided with an option to designate one or more artifacts, or types of artifacts, that will be governed by the selected value. In other example implementations, a manner and/or extent to which a selected value applies within the system 200 may be implicit or required by the system 200. For example, certain parameters may be required to be applicable for all instances of a certain type of artifact, or for all artifacts within a specific deployment.

Further in FIG. 4, the received parameter value and associated characterization thereof may be stored within one or more parameter tables (404). For example, the optimization engine 212 may receive the one or more parameter values and associated class/type information, including a relative position thereof within a hierarchical classification scheme (as illustrated and described in more detail below with respect to FIG. 5).

Afterwards, deployment procedures may be selected or obtained begin (406). For example, the deployment procedure controller 202 may identify relevant containers 121 and associated artifacts 123 and dependency graphs 125 that will be associated with the deployment, and access the deployment procedure repository 204 to obtain relevant deployment procedures.

The deployment procedure controller 202 may then identify necessary parameters, if any, associated with the obtained deployment procedures, and proceed to determine associated values thereof for the deployment being executed (408). For example, as in the more detailed example of FIG. 5, below, the deployment procedure controller 202 may attempt to fetch a parameter value for each parameter by first checking the selectable parameter repository 210 to determine whether the developer has specified a value for the parameter in question. As referenced above and described below with respect to FIG. 5, the deployment procedure controller 202 may execute such access of the selectable parameter repository 210 in a hierarchical manner that reflects and utilizes the relative levels of applicability of the parameter being considered. As also described herein, in scenarios in which the deployment procedure controller 202 determines that no selected optimization parameter exists for the parameter in question, the default deployment parameters repository 206 may be utilized to obtain a default parameter value for the parameter in question.

Finally, in the example of FIG. 4, the deployment procedure controller 202 may proceed to execute the parameterized deployment procedures (410). Accordingly, the database objects 143 may be deployed into the database 140 in a highly efficient, customizable, and flexible manner.

Thus, as described, in some deployment infrastructure systems, parameters provide an ability for controlling the execution flow of deployment infrastructure procedure calls. In the example of FIG. 5, three types of parameters are considered: deployment infrastructure ("DI") parameters, build plug-in parameters (where the build plug-in provides an example of artifact conversion engine 124, as referenced above with respect to FIG. 1), and path parameters.

Consistent with the above descriptions of various implementations of FIGS. 1-4, the DI parameters may be used to control the execution flow of deployment infrastructure procedures and container-specific procedures, e.g., may specify the time a container operation waits for a locking conflict to clear or indicate if warnings during a deployment infrastructure call should be treated as errors. Build plug-in parameters and path parameters control the execution flow of the deployment process of database artifacts, e.g., specify the batch size for batching database access or for batch processing within a build plug-in. For example, while a build plug-in parameter might control the execution flow of a build plug-in for all database artifacts of the corresponding type, a path parameter might be used to determine the execution flow of a single database artifact.

The following tables include example parameters for DI procedures and DI container-specific procedures. More particularly, Tables 1 and 2 describe types of parameters, while Table 3 describes available values for those parameters. In Tables 1-3, a meaning of many of the parameters/values will be apparent from the above description, and/or will be apparent to one of skill in the art, or are explained within the Tables themselves. It may be noted, however, that the parameters related to trace processes (e.g., trace_context, or trace_level.<trace topic>) are described in detail below, with respect to FIGS. 6-9.

Table 1 describes example parameters for DI procedures and their possible values.

TABLE 1

| DI Call | Available Parameters |
| --- | --- |
| _SYS_DI.CANCEL | container_lock_wait_timeout |
|  | trace_context |
|  | trace_level.<trace topic> |
|  | treat_warnings_as_errors |
| _SYS_DI.CONFIGURE_CONTAINER_PARAMETERS | container_lock_wait_timeout |
|  | trace_context |
|  | trace_level.<trace topic> |
| _SYS_DI.CONFIGURE_DI_PARAMETERS | trace_context |
|  | trace_level.<trace topic> |
| _SYS_DI.CONFIGURE_LIBRARIES | container_lock_wait_timeout |
|  | trace_context |
|  | trace_level.<trace topic> |
|  | undeploy |
| _SYS_DI.CREATE_CONTAINER | trace_context |
|  | trace_level.<trace topic> |
| _SYS_DI.DROP_CONTAINER | container_lock_wait_timeout |
|  | forget_container_only |
|  | ignore_deployed |
|  | ignore_errors |
|  | ignore_work |
|  | trace_context |
|  | trace_level.<trace topic> |
| _SYS_DI.EXPORT_CONTAINER | container_lock_wait_timeout |
|  | trace_context |
|  | trace_level.<trace topic> |
| _SYS_DI.GRANT_CONTAINER_API_PRIVILEGES | container_lock_wait_timeout |
|  | trace_context |
|  | trace_level.<trace topic> |

TABLE 1-continued

| DI Call | Available Parameters |
|---|---|
| _SYS_DI.GRANT_CONTAINER_API_PRIVILEGES_WITH_GRANT_OPTION | container_lock_wait_timeout<br>trace_context<br>trace_level.<trace topic> |
| _SYS_DI.GRANT_CONTAINER_SCHEMA_PRIVILEGES | container_lock_wait_timeout<br>trace_context<br>trace_level.<trace topic> |
| _SYS_DI.GRANT_CONTAINER_SCHEMA_ROLES | container_lock_wait_timeout<br>trace_context<br>trace_level.<trace topic> |
| _SYS_DI.GRANT_CONTAINER_SUPPORT_PRIVILEGE | container_lock_wait_timeout<br>trace_context<br>trace_level.<trace topic> |
| _SYS_DI.IMPORT_CONTAINER | container_lock_wait_timeout<br>trace_context<br>trace_level.<trace topic> |
| _SYS_DI.LIST_CONFIGURED_LIBRARIES | container_lock_wait_timeout<br>trace_context<br>trace_level.<trace topic> |
| _SYS_DI.LIST_LIBRARIES | trace_context<br>trace_level.<trace topic> |
| _SYS_DI.REVOKE_CONTAINER_API_PRIVILEGES | container_lock_wait_timeout<br>trace_context<br>trace_level.<trace topic> |
| _SYS_DI.REVOKE_CONTAINER_SCHEMA_PRIVILEGES | container_lock_wait_timeout<br>trace_context<br>trace_level.<trace topic> |
| _SYS_DI.REVOKE_CONTAINER_SCHEMA_ROLES | container_lock_wait_timeout<br>trace_context<br>trace_level.<trace topic> |
| _SYS_DI.REVOKE_CONTAINER_SUPPORT_PRIVILEGE | container_lock_wait_timeout<br>trace_context<br>trace_level.<trace topic> |

The following provides example pseudocode for calling a DI procedure with a parameters set:

Pseudocode 1

```
-- prepare parameters table
create table MY_PARAMETERS like _SYS_DI.TT_PARAMETERS;
insert into MY_PARAMETERS (KEY, VALUE) values ('ignore_work', 'true');
insert into MY_PARAMETERS (KEY, VALUE) values ('ignore_deployed', 'true');
-- call procedure
call _SYS_DI.DROP_CONTAINER('MY_CONTAINER', MY_PARAMETERS, ?, ?, ?);
```

Table 2 describes example parameters for container-specific procedures.

TABLE 2

| DI Container-Specific Call | Available Parameters |
|---|---|
| <container>#DI.CANCEL | container_lock_wait_timeout<br>trace_context<br>trace_level.<trace topic> |
| <container>#DI.CONFIGURE_CONTAINER_PARAMETERS | treat_warnings_as_errors<br>container_lock_wait_timeout<br>trace_context<br>trace_level.<trace topic> |
| <container>#DI.CONFIGURE_LIBRARIES | container_lock_wait_timeout<br>trace_context<br>trace_level.<trace topic><br>undeploy |
| <container>#DI.DELETE | container_lock_wait_timeout<br>ignore_non_existing_paths<br>recursive<br>trace_context<br>trace_level.<trace topic> |
| <container>#DI.GRANT_CONTAINER_API_PRIVILEGES | container_lock_wait_timeout<br>trace_context<br>trace_level.<trace topic> |
| <container>#DI.GRANT_CONTAINER_API_PRIVILEGES_WITH_GRANT_OPTION | container_lock_wait_timeout<br>trace_context<br>trace_level.<trace topic> |

TABLE 2-continued

| DI Container-Specific Call | Available Parameters |
|---|---|
| <container>#DI.GRANT_CONTAINER_SCHEMA_PRIVILEGES | container_lock_wait_timeout<br>trace_context<br>trace_level.<trace topic> |
| <container>#DI.GRANT_CONTAINER_SCHEMA_ROLES | container_lock_wait_timeout<br>trace_context<br>trace_level.<trace topic> |
| <container>#DI.LIST | container_lock_wait_timeout<br>ignore_files<br>ignore_folders<br>recursive<br>trace_context<br>trace_level.<trace topic> |
| <container>#DI.LIST_CONFIGURED_LIBRARIES | container_lock_wait_timeout<br>trace_context<br>trace_level.<trace topic> |
| <container>#DI.LIST_DEPLOYED | container_lock_wait_timeout<br>ignore_files<br>ignore_folders<br>recursive<br>trace_context<br>trace_level.<trace topic> |
| <container>#DI.MAKE | combine_plug-in_jobs<br>container_lock_wait_timeout<br>do_sanity_checks<br>dump_graph<br>simulate_make<br>stop_after_graph_creation<br>stop_after_make<br>trace_context<br>trace_level.<trace topic><br>treat_warnings_as_errors |
| <container>#DI.MAKE_ASYNC | combine_plug-in_jobs<br>container_lock_wait_timeout<br>do_sanity_checks<br>dump_graph<br>simulate_make<br>stop_after_graph_creation<br>stop_after_make<br>trace_context<br>trace_level.<trace topic><br>treat_warnings_as_errors |
| <container>#DI.READ | container_lock_wait_timeout<br>ignore_files<br>ignore_folders<br>recursive<br>trace_context<br>trace_level.<trace topic> |
| <container>#DI.READ_DEPLOYED | container_lock_wait_timeout<br>ignore_files<br>ignore_folders<br>recursive<br>trace_context<br>trace_level.<trace topic> |
| <container>#DI.REVOKE_CONTAINER_API_PRIVILEGES | container_lock_wait_timeout<br>trace_context<br>trace_level.<trace topic> |
| <container>#DI.REVOKE_CONTAINER_SCHEMA_PRIVILEGES | container_lock_wait_timeout<br>trace_context<br>trace_level.<trace topic> |
| <container>#DI.REVOKE_GRANT_CONTAINER_SCHEMA_ROLES | container_lock_wait_timeout<br>trace_context<br>trace_level.<trace topic> |
| <container>#DI.STATUS | container_lock_wait_timeout<br>trace_context<br>trace_level.<trace topic> |
| <container>#DI.WRITE | container_lock_wait_timeout<br>trace_context<br>trace_level.<trace topic> |

The following illustrates example pseudocode for calling a container-specific procedure with parameters set:

Pseudocode 2

```
-- prepare path content table
create table MY_PATH_CONTENT like
_SYS_DI.TT_FILESFOLDERS_CONTENT;
insert into MY_PATH_CONTENT (PATH, CONTENT) values
('mypath/', ' ');
insert into MY_PATH_CONTENT (PATH, CONTENT) values
('mypath/myfile1.hdbtable', 'ROW TABLE MY_TABLE (X
INTEGER)');
```

-continued

Pseudocode 2

```
insert into MY_PATH_CONTENT (PATH, CONTENT) values
('mypath/.hdiconfig', '{ "file_suffixes" : { "hdbtable" : {
"plug-in_name" : "com.sap.hana.di.table", "plug-in_version" :
"12.0.0" } } }');
-- prepare parameters table
create table MY_PARAMETERS like _SYS_DI.TT_PARAMETERS;
insert into MY_PARAMETERS (KEY, VALUE) values
('container_lock_wait_timeout', '10');
-- call procedure
call MY_CONTAINER#DI.WRITE(MY_PATH_CONTENT,
MY_PARAMETERS, ?, ?, ?);
```

Table 3 describes the parameters available in an example deployment infrastructure and their possible values.

TABLE 3

| DI Parameter | Possible Values | Description |
| --- | --- | --- |
| combine_plug-in_jobs | true, false | Indicates if calls to build plug-ins should be combined if possible. |
| container_lock_wait_timeout | 0 . . . 2,147,483,647 | Specifies the time (in milliseconds) a container operation waits for a locking conflict to clear. |
| do_sanity_checks | true, false | Indicates if additional sanity checks should be enabled during the make. |
| dump_graph | true, false | Indicates if the dependency graph of the make should be printed to the container log. |
| forget_container_only | true, false | Indicates if only the metadata of a container should be deleted when dropping a container. Set to "true" when the schemas/users that belong to the container had already been manually dropped. |
| ignore_deployed | true, false | Indicates if existing files in the deployed file system are to be ignored when dropping a container. |
| ignore_errors | true, false | Indicates if errors during a HANA DI call should be ignored, i.e., execute and commit as many internal operations as possible. Failing operations are reported to the user. |
| ignore_files | true, false | Indicates if files are to be ignored in the output when reading files. |
| ignore_folders | true, false | Indicates if folders are to be ignored in the output when reading files. |
| ignore_non_existing_paths | true, false | Indicates if non-existing paths should be ignored, e.g., when deleting folders. |
| ignore_work | true, false | Indicates if existing files in the work file system are to be ignored when dropping a container. |
| recursive | true, false | Indicates if folders are to be read or deleted recursively. |
| simulate_make | true, false | Indicates if the make should only be simulated. |
| stop_after_graph_creation | true, false | Indicates if the make should stop after creating the dependency graph. |
| stop_after_make | true, false | Indicates if the make should stop after the main make, i.e., no post-make steps are to be executed. |
| trace_context | request, container | Indicates if - during a HANA DI request - all traces for trace topics configured via the trace_level_<trace topic> parameter are written to a separate trace file in addition to the diserver trace file. If set to "request", a new trace file is created for the request. For container operations, if set to "container", a trace file for the corresponding container is created or appended to. |

TABLE 3-continued

| DI Parameter | Possible Values | Description |
| --- | --- | --- |
| trace_level.<trace topic> | Fatal, Error, Warning, Info, Interface, Debug, InterfaceFull, DebugFull | Specifies the trace level of a specific trace topic. <trace topic> may be an arbitrary HANA trace topic. |
| treat_warnings_as_errors | true, false | Indicates if warnings during a HANA DI call should be treated as errors. |
| undeploy | true, false | Indicates if - in case of a call to configure libraries - files corresponding to a library to be removed should also be undeployed. |

In some implementations, as already described, the deployment infrastructure may support multiple types of parameters, e.g., supports three types of parameters for controlling the execution flow of build plug-ins. In the example of FIG. 5, at a global level, a "plug-ins-wide parameter" applies to all build plug-ins supporting the parameter. On a more fine-grained level, a "plug-in-specific parameter" only applies to the specified build plug-in. A "path parameter" serves to control the handling of a single file. Table 4 describes the structure of each example parameter type. Examples are provided in Table 4:

TABLE 4

| Parameter Type | File | Parameter Structure |
| --- | --- | --- |
| plug-ins-wide parameter | — | com.sap.hana.di/<key> |
| plug-in-specific parameter | — | com.sap.hana.di.<plug-in>/<key> |
| path parameter | <file> | <key> |

From the point of view of a build plug-in, the three types of parameters form a hierarchy, in which the most specific parameter type is considered first. FIG. 5 illustrates the process of fetching a parameter from the point of view of a build plug-in. The plug-in-specific parameters support additional layering by allowing additional layers within the parameter structure. For example, if a requested parameter "com.sap.hana.di.<layer1>.<plug-in14<key>" is not found, the build plug-in automatically searches for a parameter "com.sap.hana.di.<layer1>/<key>". Additional layers may also be provided, e.g., "com.sap.hana.di.<layer1>.<layer2> . . . <layer n>.<plugin1>/<key>.

Table 5 depicts an example layering of parameters.

TABLE 5

| Parameter Type | File | Parameter Structure |
| --- | --- | --- |
| plug-ins-wide parameter | — | com.sap.hana.di/<key> |
| layered parameter | — | com.sap.hana.di.<layer1>/<key> |
| layered plug-in parameter | — | com.sap.hana.di.<layer1>.<plug-in1>/<key> |
| path parameter | <file> | <key> |

Table 6 lists example parameters for the build plug-in in some implementations of a deployment infrastructure.

TABLE 6

| Build Plug-in | Available Build Plug-in Parameters | Available Path Parameters |
| --- | --- | --- |
| com.sap.hana.di.cds | force_undeploy | — |
| com.sap.hana.di.role | force_undeploy | — |
| com.sap.hana.di.sequence | force_undeploy | — |
| com.sap.hana.di.table | force_undeploy | — |
| com.sap.hana.di.tabledata | batch_size | batch_size |

The following is example pseudocode for calling the make procedure with a plug-ins-wide parameter set:

Pseudocode 3

```
-- prepare deploy paths table
create table MY_DEPLOY_PATHS like
_SYS_DI.TT_FILESFOLDERS;
insert into MY_DEPLOY_PATHS (PATH) values
('mypath/myfile1.hdbtable');
insert into MY_DEPLOY_PATHS (PATH) values
('mypath/.hdiconfig');
-- prepare parameters table with a plug-ins-wide parameter
create table MY_PARAMETERS like _SYS_DI.TT_PARAMETERS;
insert into MY_PARAMETERS (KEY, VALUE) values
('com.sap.hana.di /force_undeploy', 'true');
-- call procedure
call MY_CONTAINER#DI.MAKE(MY_DEPLOY_PATHS,
_SYS_DI.T_NO_FILESFOLDERS,
_SYS_DI.T_NO_FILESFOLDERS_PARAMETERS,
MY_PARAMETERS, ?, ?, ?);
```

The following is pseudocode providing an example for calling the make procedure with a plug-in-specific parameter set:

Pseudocode 4

```
-- prepare deploy paths table
create table MY_DEPLOY_PATHS like
_SYS_DI.TT_FILESFOLDERS;
insert into MY_DEPLOY_PATHS (PATH) values
('mypath/myfile1.hdbtable');
insert into MY_DEPLOY_PATHS (PATH) values
('mypath/.hdiconfig');
-- prepare parameters table with a plug-in-specific parameter
create table MY_PARAMETERS like _SYS_DI.TT_PARAMETERS;
insert into MY_PARAMETERS (KEY, VALUE) values
('com.sap.hana.di.table/force_undeploy', 'true');
-- call procedure
call MY_CONTAINER#DI.MAKE(MY_DEPLOY_PATHS,
_SYS_DI.T_NO_FILESFOLDERS,
_SYS_DI.T_NO_FILESFOLDERS_PARAMETERS,
MY_PARAMETERS, ?, ?, ?);
```

The following is example pseudocode for calling the make procedure with a path parameter set:

---
Pseudocode 5
---
-- prepare deploy paths table
create table MY_DEPLOY_PATHS like
_SYS_DI.TT_FILESFOLDERS;
insert into MY_DEPLOY_PATHS (PATH) values
('mypath/myfile1.hdbtable');
insert into MY_DEPLOY_PATHS (PATH) values
('mypath/.hdiconfig');
-- prepare path parameters table
create table MY_PATH_PARAMETERS like
_SYS_DI.TT_FILESFOLDERS_PARAMETERS;
insert into MY_PATH_PARAMETERS (PATH, KEY, VALUE) values
('mypath/myfile1.hdbtable', 'force_undeploy', 'true');
-- call procedure
call MY_CONTAINER#DI.MAKE(MY_DEPLOY_PATHS,
_SYS_DI.T_NO_FILESFOLDERS, MY_PATH_PARAMETERS,
_SYS_DI.T NO_PARAMETERS, ?, ?, ?);

---

Table 7 describes example build plug-in parameters available in some implementations of a deployment infrastructure and their possible values.

TABLE 7

| Build Plug-in Parameter | Possible Values | Description |
| --- | --- | --- |
| batch_size | 0 . . . 2,147,483,647 | Specifies the batch size, e.g., for batch database access or for batch processing within a build plug-in. |
| force_undeploy | true, false | Indicates if the undeployment of files should be forced within a build plug-in that would normally alter an existing database object instead of simply recreating it. |

Figure 6:
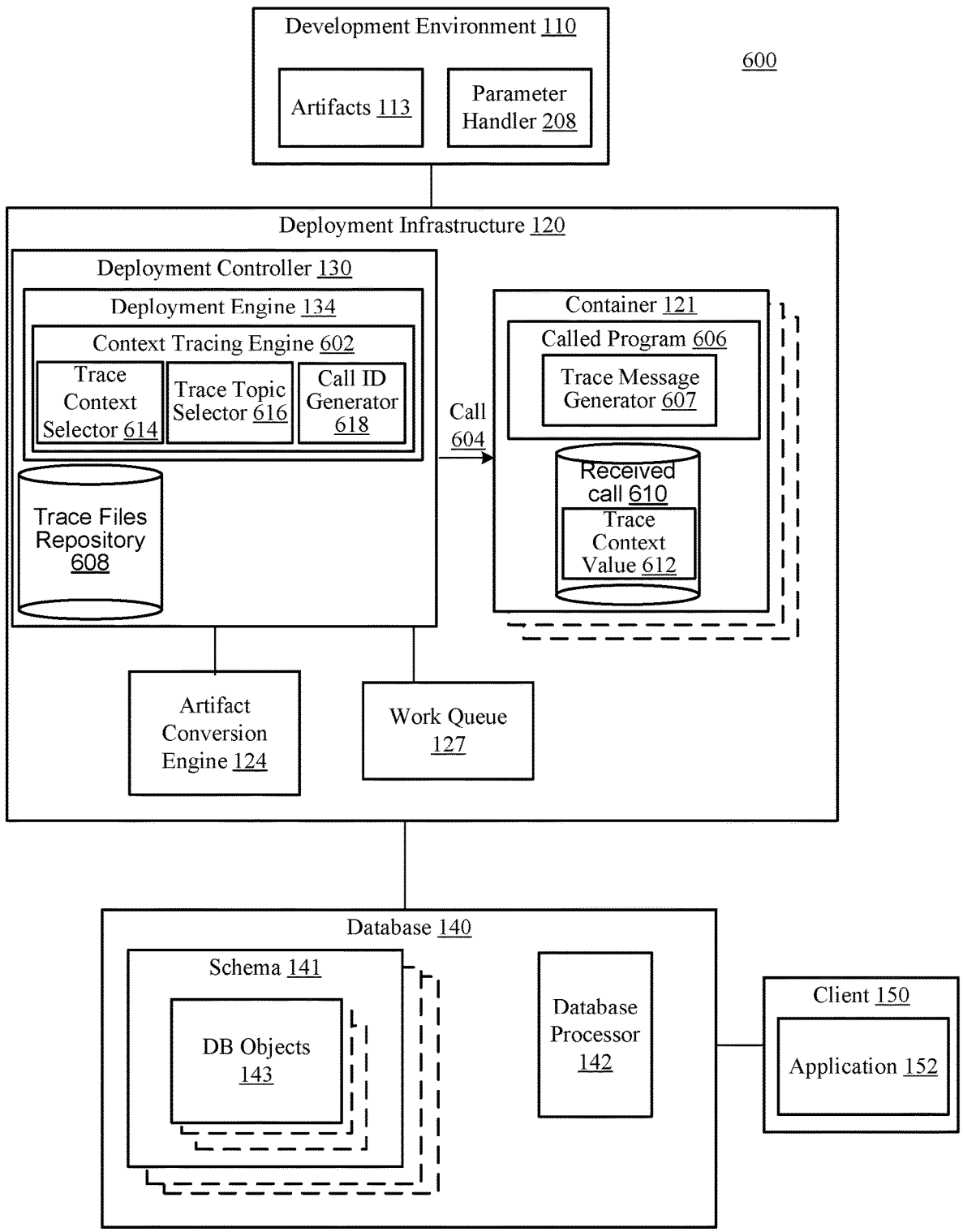
FIG. 6 is a block diagram of a system for software logging using context tracing.

FIG. 6 is a block diagram of a system 600 for software logging using confcontext tracing. In the example of FIG. 6, a context tracing engine 602 is associated with the sending of a procedure call 604, also referred to as a call, or as a request, to a called program 606. From the examples of FIGS. 2-5, above, and as described in various non-limiting examples, below, it will be appreciated that the call 604 may be associated with deployment procedures governed by the deployment controller 130, e.g., in conjunction with the deployment engine 134 and deployment procedures from the repository 204.

More generally, and as described in detail below, the context tracing engine 602 may be configured to modify the call 604 to parameterize, and thereby govern, logging operations of the called program 606 in a manner that facilitates fast, efficient, and useful analysis of operations of the called program 606, including operations of the called program specifically called by the call 604 itself. As a result, for example, the context tracing engine 602 enables accurate identification of portions of the called program 606 associated with errors or sub-optimal operation thereof (as well as a relationship of such portions to the call 604 and any included errors therein), thereby enabling correction and/or optimization of operations of the called program 606.

In the example of FIG. 6, software logging refers generally to any technique used to track and analyze a program flow of operations of the called program 606. In other words, as the called program 606 executes sequentially and reaches a predesignated portion of its executing code, the called program 606 may generate a log or trace message characterizing or identifying execution aspect(s) of the associated code portion, using, e.g., a trace message generator 607.

In other words, as the called program 606 executes its code, log messages generated at each of the predesignated code portions thereof are written to a trace files repository 608. In this way, the trace or logged information may be used to analyze potential errors or other behaviors of the called program 606 during its execution. For example, each log message may include some or all of: a timestamp identifying a time of execution of a corresponding code portion, a location within the executing code associated with the writing of the log message, content of control variables that control the program flow of the called program 606, and any additional free-form text (e.g., describing a current logical state, or current processing operation).

In the simplified example of FIG. 6, a single call 604 is described and illustrated with respect to the called program 606. However, in the context of operations of FIG. 6, as well as during operations of various other types of systems implementing called programs, there may be a very large number of calls or requests sent to one or more called programs. Therefore, as referenced above and described in more detail below, the context tracing engine 602 may be configured to modify the call 604 to include instructions for the called program 606 governing the logging operations of the called program 606 in a manner that facilitates fast and productive analysis of generated log messages (also referred to herein as trace messages) and associated calls, even when a very large number of calls are used.

In particular, as illustrated in FIG. 6, the called program 606 may be provided with the received call 610 within an execution environment of the called program 606, including a trace context value 612 that is included within the call 604 and that governs write operations of the called program 606 in writing trace messages into trace files of the trace files repository 608. More particularly, as described in detail below, e.g., with respect to FIG. 7, the called program 606 may be configured to write specific types of trace messages to pre-identified, corresponding storage locations within corresponding trace files of the trace files repository 608. Thus, by segregating the various trace messages into pre-designated storage locations, the system 600 enables a user to identify and extract/analyze relevant trace messages for a faulty call or other faulty operation, or other behaviors, of the called program 606.

In the example of FIG. 6, the context tracing engine 602 includes a trace context selector 614 that is configured to execute the above-referenced types of modifications of the call 604, including modifying call 604 to include the trace context value 612. In other words, the trace context selector 614 is configured to modify the call 604 to include the trace context value 612 and thereby provide instructions to the called program 606 and govern operations of the trace message generator 607 in selecting one of a plurality of appropriate storage locations for corresponding trace messages stored within trace files of the trace files repository 608.

Further in FIG. 6, the context tracing engine 602 is illustrated as including a trace topic selector 616. In general, the trace topic selector 616 is configured to additionally modify the call 604 and thereby provide the called program 606 with instructions regarding content or other aspects of log messages to be written by the trace message generator 607 within the trace files repository 608. For example, such content may include instructions regarding a characterization of a corresponding code portion of the called program 606 as being associated with a warning or an error (or type of error) or identifying specific control variables or type of control variables of the called program 606 to be associated with associating logging operations. Thus, the trace context selector 614 is configured to govern a storage location and associated storage operations for storing logged messages associated with the call 604, while the trace topic selector 616 governs a content and other aspects of the log messages to be stored at those storage locations (i.e., in accordance with operations of the trace context selector 614).

In example implementations, it may occur that the trace context selector 614 designates that all trace messages associated with the call 604 should be stored within a single trace file of the trace files repository 608 so that the resulting call-specific trace file has a 1:1 correspondence with trace messages associated with the call 604. In such cases, as shown, the context tracing engine 602 may include a call ID generator 618 that generates a unique call identifier (ID) to be associated with the call 604, and ultimately included by the trace message generator 607 within the call-specific trace file stored within the trace files repository 608. Accordingly, as referenced above, the system 600 makes it straightforward to identify and extract relevant trace messages for the specific call 604, even when the call 604 is one of a large number of calls being processed.

In the example implementation of FIG. 6, the context tracing engine 602 is illustrated as being executed in conjunction with operations of the deployment engine 134. Accordingly, as referenced above with respect to Tables 1-3, the context tracing operations of the context tracing engine 602 may be implemented in conjunction with, or as part of, described operations of the deployment procedure controller 202 and/or the optimization engine 212 of FIG. 2.

In other words, although the context tracing engine 602 is illustrated separately in FIG. 6 for purposes of clarity and convenience of explanation, as well as for understanding operations of the context tracing engine 602 outside of the specific example of the deployment infrastructure 120, it will nonetheless be appreciated that the overall architecture of the system 600 may be leveraged to implement the context tracing engine 602 and associated operations thereof in a highly efficient manner that is optimized for use in the operations of the deployment infrastructure 120.

For example, it will be appreciated that parameter values for parameters related to context tracing operations of the context tracing engine 602 may be stored in one or both of the repositories 210, 206 of FIG. 2. In other words, for example, the parameter handler 208 may be used to provide a developer using the development environment 110 with an ability to set and otherwise configure values for trace context parameters. In this way, as with many or all of the various types of parameters described above with respect to FIGS. 2-5, trace context parameters may be configured by developers in highly flexible, customizable, and convenient manners that enable the developer to obtain desired results.

In particular, for example, Table 1 above illustrates that the various deployment infrastructure calls of the first column of Table 1 may each be associated with available parameters that include trace_context and trace_level parameters. Similarly, the container-specific deployment infrastructure calls of Table 2 may be associated with the same available parameters related to context tracing. As illustrated in detail in Table 3, above, the trace_context parameter may be configured to have possible parameter values of "request" or "container."

As further illustrated in the third column of Table 3, trace_context parameter may thus be utilized, through selection of the available values of column 2, to determine whether all traces/log messages for trace topics are written to a separate trace file (perhaps in addition to, or as an alternative to, a writing of the same trace messages to a general trace file for the deployment infrastructure). In other words, as illustrated and described below in more detail with respect to FIG. 7, if the trace_context parameter is set to a value of "request," then a new trace file may be created and populated that is specific to the associated request or call.

On the other hand, in the examples, if the trace_context parameter value is set to "container," then a trace file for the corresponding container may be created or supplemented. More generally, the trace context parameter value specifies that trace messages generated by executing a plurality of calls having a common characteristic (e.g., same container, or any other same or similar context) during the execution of the called program 606 are written to a trace file identified with respect to the common characteristic as the identified storage location. In this way, a trace file access request for the trace file may easily be specified with respect to the common characteristic, so that a desired trace file may easily be provided in response thereto.

As further illustrated in table 3, and in conjunction with operations of the trace topic selector 616 of the context tracing engine 602, a context parameter trace_level.<trace topic> may be utilized to specify a trace level of a specific trace topic. In this context, a trace topic may refer to an arbitrary or otherwise defined trace topic associated with the deployment infrastructure 120 of FIG. 6, or any appropriate or associated setting of the context tracing engine 602. As shown in the second column of FIG. 3, possible values for the trace_level parameter include "Fatal," "Error," "Warning," "Info," "Interface," "Debug," "InterfaceFull," and "DebugFull." Of course, these values are provided merely for the sake of example, and should not be considered limiting with respect to possible values that may be utilized for parameterizing available trace levels.

In the example of FIG. 6, and in some of the examples just discussed with respect to Tables 1-3, the called program 606 is illustrated as executing in the context of the container 121. Of course, as may also be appreciated from the above description, the called program 606 may execute in conjunction with operations of the artifact conversion engine 124, or instances thereof, including in the context of the types of build plug-ins described above, or in any suitable computing setting.

Figure 7:
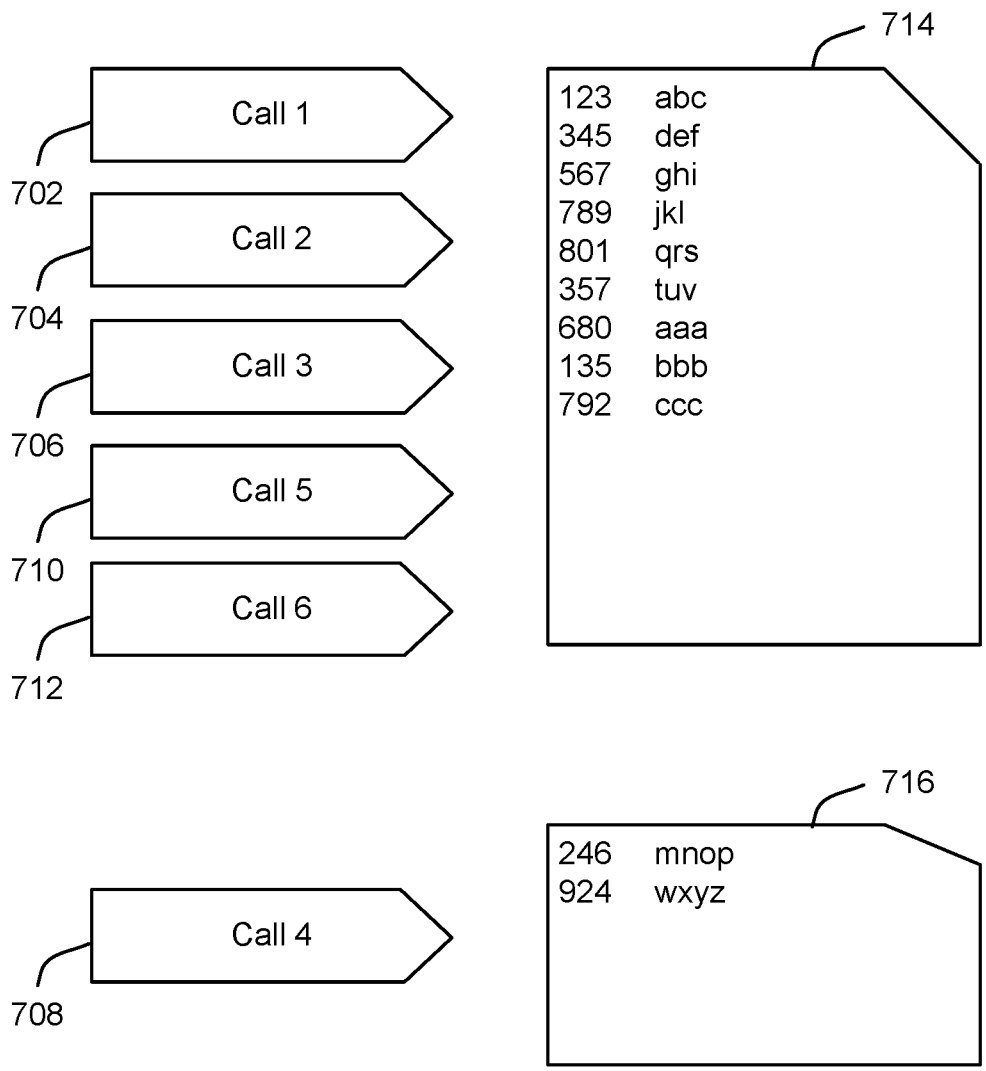
FIG. 7 is a block diagram of trace files created using the system of FIG. 6.

For purposes of the example of FIG. 7, however, example implementations described above are considered in which the called program 606 does operate in the context of the container 121. Moreover, with respect to the context tracing engine 602, in the example of FIG. 7, implementations are illustrated and described in which a plurality of calls 702-712 to the called program 606 are designated by the context tracing engine 602 are configured (e.g., parameterized) such that associated operations of the called program 606 generate log messages to be stored within the trace files repository 608 either as being associated with the container 121, or as being specific to an individual call.

More specifically, as shown in FIG. 7, the plurality of calls 702-712 may be generated, e.g., by the deployment engine 134. In conjunction therewith, the context tracing engine 602 may be configured to parameterize the calls 702, 704, 706, 710, 712 as requiring log messages to be generated and stored in a single trace file 714 that is associated with the container 121. Thus, as conceptually represented in the example of FIG. 7, the trace file 714 may include a plurality of trace messages, also referred to as log messages, corresponding to the types of trace topics and associated trace levels referenced and described above, e.g., with respect to Tables 1-3. As may be appreciated, because the trace file 714 is stored within the trace files repository 608 and identified as being associated with the container 121, a developer using the development environment 110 may easily identify all of the log messages included therein, e.g., all log messages associated with relevant operations of the container 121, in a fast and straightforward manner.

Meanwhile, the call 708 may be parameterized by the context tracing engine 602 with a corresponding trace context parameter value that causes all corresponding operations of the called program 606 to generate log messages to be stored within a separate trace file 716 within the trace files repository 608. As with the trace files 714, the content of the trace file 716 represents logged information characterizing relevant operations of the called program 606 in executing the call 708 as such information relates to the selected trace topics, trace levels, and other trace-related information.

As may thus be appreciated from the simplified example of FIG. 7, it is possible to access the trace file 716 from the trace files repository 608 and thereby easily obtain all logging information desired with respect to operations of the called program associated with execution of the call 708. Further, as the call 708 may be individually parameterized, it is possible to designate additional or alternative trace topics and trace levels as being associated therewith, and as compared to the trace topics and trace levels of the calls 702, 704, 706, 710, and 712 (which may also be individually parameterized using the context tracing engine 602). Accordingly, a developer using the development environment 110 may be provided with highly configurable and flexible generation of logging information, so that the developer is provided with an ability to customize and select the types of desired logging information. Moreover, the developer will be able to identify and extract portions of the resulting logging information that will be most useful in diagnosing and solving difficulties experienced in the execution of the called program 606, or otherwise optimizing operations of the called program 606, in a fast and efficient manner.

It is also possible to provide a global configuration for the called program (or portions thereof) governing associated logging or trace operations. However, tracing techniques in general may be particularly useful for software having few or no other options for providing feedback on its execution, including background services and batch programs such as may be associated with operations of the deployment infrastructure 120. As already referenced, such services often process a very large number of requests, and, in particular, when a service is capable of handling multiple or parallel requests at the same time, identification and extraction of a faulty request or faulty call (or other behaviors) without benefit of the context tracing engine 602 may be difficult or impossible. Consequently, it will be appreciated that operations of the context tracing engine 602 enhance a design and functionality of the called program 606.

Figure 8:
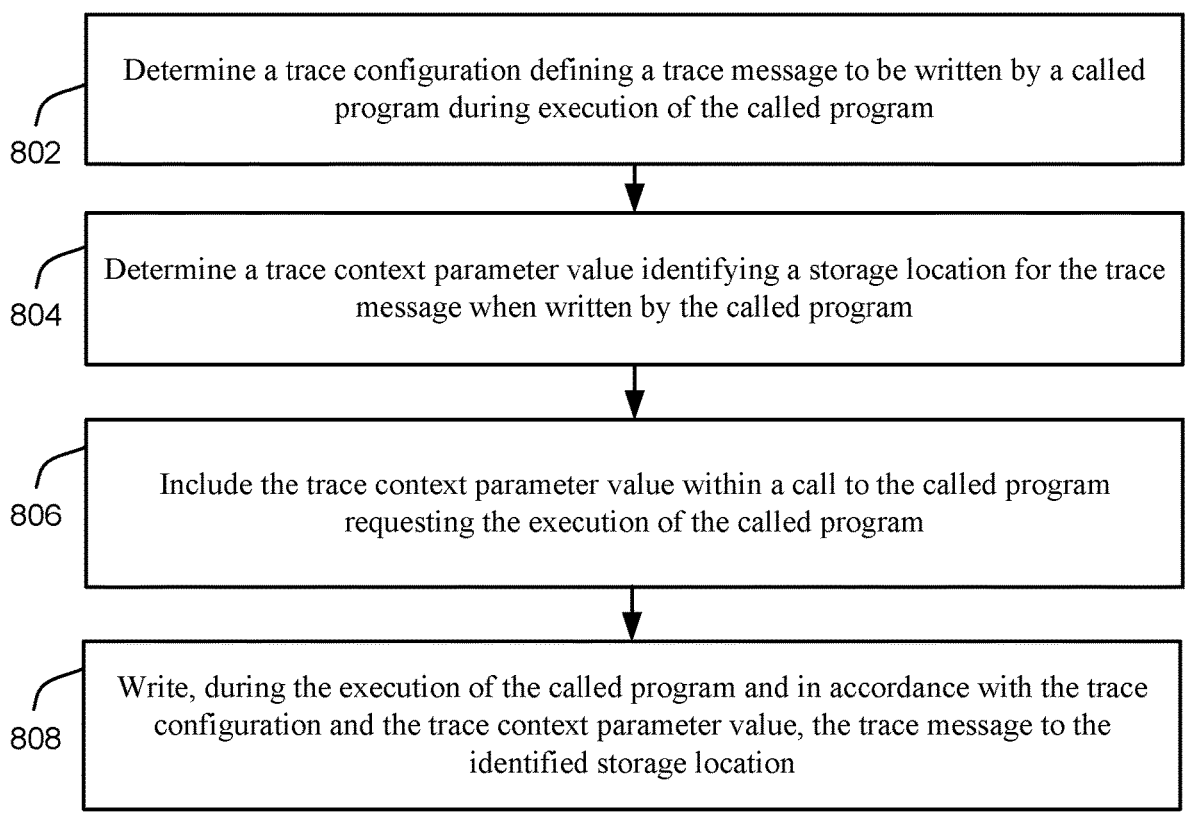
FIG. 8 is a flowchart illustrating example operations of the system of FIG. 6.

FIG. 8 is a flowchart illustrating example operations of the system 600 of FIG. 6, including the context tracing engine 602 and related operations of the called program 606. In the example of FIG. 8, operations 802-808 are illustrated as separate, sequential operations. In various implementations, additional or alternative operations or sub-operations may be included, and/or one or more operations or sub-operations may be omitted. In all such implementations, any two or more operations or sub-operations may be executed in a partially or completely overlapping or parallel manner, or in a nested, iterative, looped, or branched fashion.

In the example of FIG. 8, a trace configuration defining a trace message to be written by a called program during execution of the called program may be determined (802). For example, as referenced above, the context tracing engine 602 may be utilized to designate whether and how the trace message will include various characteristics or types of information, such as a timestamp of generation of the trace message, identification of a code location of the called program associated with the trace message, one or more execution conditions existing at a time of generation of the trace message, or other aspects of the trace message.

A trace context parameter value identifying a storage location for the trace message when written by the called program may be determined (804). For example, the trace context selector 614 may be configured to set a value for identifying a trace file to be stored within the trace files repository 608.

The trace context parameter value may then be included within a call to the called program requesting the execution of the called program (806). For example, as described, the trace context selector 614 may be configured to include the trace context parameter value within the call 604 to the called program 606. As described with respect to FIG. 7, the trace context parameter value may, for example, designate the storage location as including either the trace file 714 associated with the container 121, or the trace file 716, associated with a specific call (e.g., the call 708).

During the execution of the called program and in accordance with the trace configuration and the trace context parameter value, the trace message may be written to the identified storage location (808). For example, the trace message generator 607 may be configured to generate, at a corresponding, identified code portion (e.g., during execution thereof) of the called program 606, the corresponding trace message within a corresponding trace file of the trace files repository 608.

For example, referring again back to FIG. 7, it may occur that, during normal operations of the deployment engine 134, the calls 702, 704, 706 are initially generated and sent as request to the called program 606 of the container 121, resulting in the sequential writing of corresponding trace messages within the trace file 714, as each call 702-706 is sequentially executed by the called program 606. Subsequently, the call 708 may be received at the called program 606 and executed, resulting in the writing of corresponding trace messages to the corresponding trace file 716 associated specifically with the call 708. Subsequently, the call 710 and the call 712 may be received at the called program 606, resulting in the writing of corresponding trace messages to the trace file 714 associated with the container 121.

Figure 9:
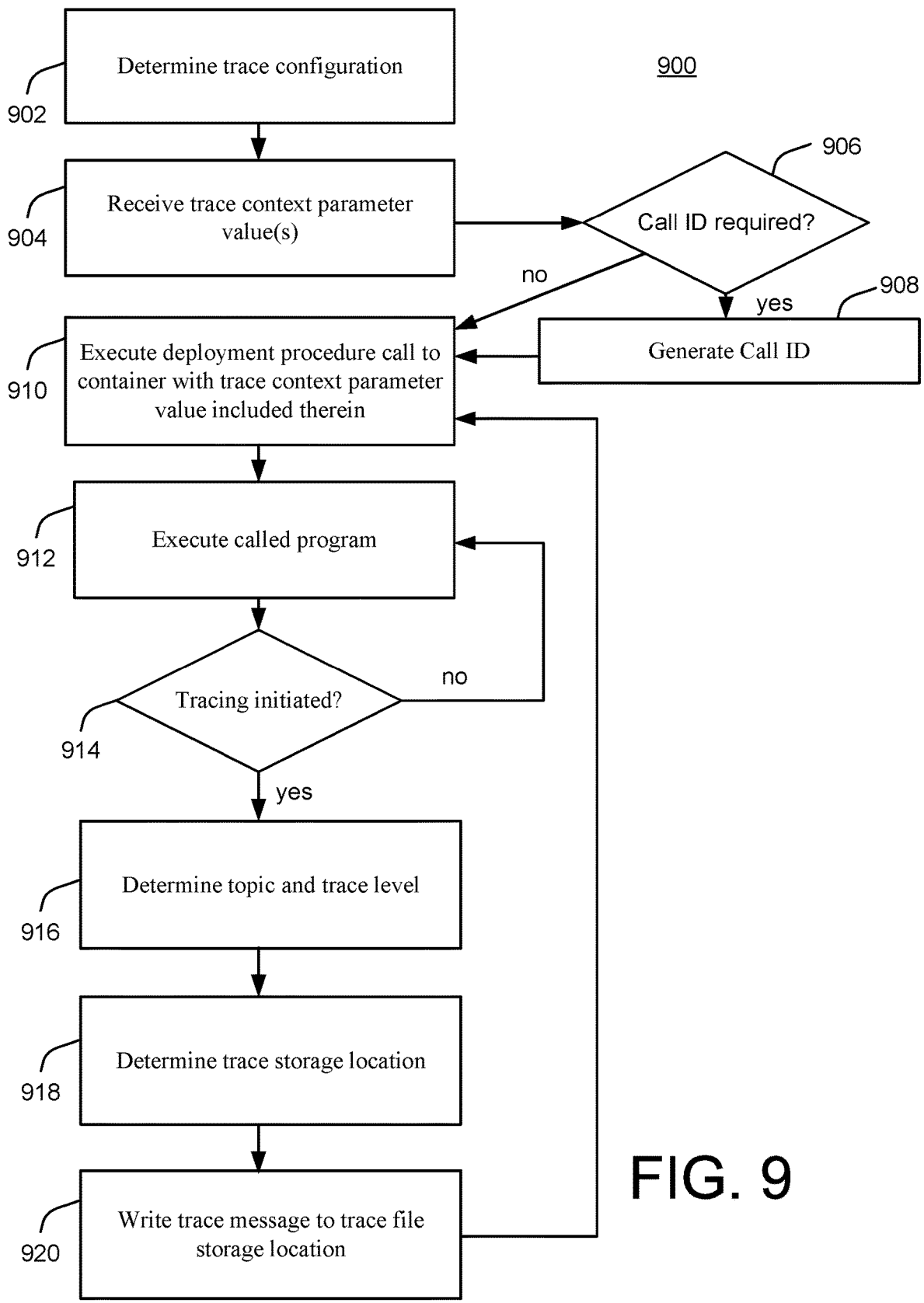
FIG. 9 is a flowchart illustrating more detailed example implementations of the system of FIG. 6.

FIG. 9 is a flowchart 900 illustrating more detailed example operations of the system 600 of FIG. 6. In particular, FIG. 9 more explicitly illustrates the sequential nature of the generation of the various trace messages, including the dynamic manner in which the various trace messages may be written on the fly to various corresponding trace files.

In the example of FIG. 9, the initial trace configuration for one or more trace operations may be determined (902), including whether and how each trace message will be generated as including logging-relevant information (e.g., code location, control variables, or other logging-relevant information). In conjunction therewith, one or more trace context parameter values may be received (904). For example, one or more trace topics and associated trace levels may be received, in conjunction with receiving the trace context parameter value identifying a storage location (e.g., particular trace file) to be used when writing the corresponding trace messages.

Since calls, or types of calls, may be individually parameterized, and since there may be a large number of calls, it will be appreciated that there may be a correspondingly large number of trace files to be created within the trace files repository 608. For example, if a large number of calls are configured for generation of associated trace messages to be generated in conjunction with each call (or type of call), then a correspondingly large number of trace calls will be required at the trace calls repository 608. Additionally, large numbers of the various calls may be associated with trace calls corresponding to one or more containers, one or more artifact conversion engines, or any other suitable or available criteria for designating individual trace files within the trace files repository 608.

In conjunction therewith, the call ID generator 618 may generate a call ID if a call ID is required for the trace message to be written (906). That is, as described above, a call ID generator 618 may be utilized to generate a unique identifier corresponding to, and correlated with, an individual call requesting a call-specific trace file, so as to thereby facilitate fast and efficient access of the call-related trace messages within the call-specific trace file when generated.

Once generated (908), or if the call ID is not required (906), such as when the trace message is designated as being written to a container-specific trace file (such as the trace file 714 of FIG. 7), then corresponding individual deployment procedure calls are executed (910), the calls will be received by the called program 606 and executed thereby (912). As described, the various calls may be executed sequentially, and also may be executed in parallel in scenarios in which the deployment engine 134 and the called program 606 support such parallel execution.

At each stage of the execution, determinations may be made as to whether tracing should be initiated in conjunction therewith (914). If not, the called program simply continues executing (912).

If, however, tracing is initiated (914), then the trace message generator 607 may determine, from an analysis of the relevant, received call, a nature and content of the trace file to be written (916). As referenced above, in some implementations, some aspects of the content of trace messages (e.g., such as inclusion of a timestamp) may be universal to all trace messages, or to groups or types of trace messages.

By analyzing the call in question, e.g., by analyzing the trace context parameter values included therein, the trace message generator 607 may determine a storage location at which to write the trace message (918).

The trace message generator 607 may proceed to write the resulting trace message within the appropriate trace file of the trace files repository 608 (920). If a call ID is required, the trace message generator 607 may proceed to execute the write operation to the corresponding trace file of the trace files repository 608, using the appropriate call ID.

The process flow of FIG. 9 may then continue with further execution of a subsequent deployment procedure call (912), and subsequent, corresponding execution of the called program 606 (914). Considering the iterative nature of the flowchart 900 of FIG. 9, it will be appreciated that, during a first iteration associated with a particular trace context parameter value, it will generally be necessary to create a corresponding trace file within the trace files repository 608. For example, when processing a first call including a trace context parameter value identifying a particular container, the trace message generator 607 may be required to create a corresponding trace file for that container. During subsequent calls that also identify the same container, the trace message generator 607 will simply append the corresponding trace message to the same container-specific trace file. Similarly, for a call parameterized to result in a call-specific trace file, a corresponding call ID may initially be generated and utilized to create a corresponding trace file. If there are any subsequent operations of the called program 606 also requested by the same call, then resulting trace messages will be written to the same trace file.

Thus, techniques are described for defining a plurality of call characteristics (e.g., a unique identity of a call, or a container common to a plurality of calls) as available values for a trace context parameter associated with generation of trace messages logging execution aspects of a plurality of calls when executed by a called program, and thereafter receiving a trace context parameter value for the trace context parameter that identifies a call characteristic of the plurality of call characteristics to be used. In this way, the trace context parameter value may be included within a call of the plurality of calls to the called program. Then, a generated trace message may be received in response to execution of the call by the called program, and stored within a trace file defined with respect to the identified call characteristic.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to perform operations comprising:
    determining at least one database artifact of a plurality of artifacts, the at least one database artifact specifying at least one database object to be deployed within a database system using at least one deployment procedure of a plurality of deployment procedures that are executable in an order defined by a dependency graph;
    receiving at least one selectable parameter value for at least one deployment procedure parameter for the at least one deployment procedure of the plurality of deployment procedures; and
    executing the plurality of deployment procedures, in the order defined by the dependency graph, using the at least one selectable parameter value for the at least one deployment procedure parameter of the at least one deployment procedure, to thereby deploy the at least one database object into the database system.

2. The computer program product of claim 1, wherein the at least one database artifact provides a declarative description of the at least one database object, and the plurality of deployment procedures are configured to convert the at least one database artifact into the at least one database object including at least one executable database object.

3. The computer program product of claim 1, wherein the plurality of deployment procedures govern conversion of the at least one database artifact into the at least one database object and any associated interaction with the database system.

4. The computer program product of claim 1, wherein the operations further comprise:
    receiving the at least one selectable parameter value and replace a default parameter value for the at least one deployment procedure parameter therewith.

5. The computer program product of claim 1, wherein the operations further comprise:
    storing the at least one selectable parameter value in a parameter table; and
    retrieving, during the execution of a corresponding deployment procedure of the plurality of deployment procedures, the at least one selectable parameter value from the parameter table for use in the execution of the corresponding deployment procedure.

6. The computer program product of claim 1, wherein the at least one selectable parameter value applies to a single database artifact of the at least one database artifact.

7. The computer program product of claim 1, wherein the at least one database artifact comprises a plurality of database artifacts, each classified as a type of corresponding types of artifact conversion processes, and further wherein the at least one selectable parameter value applies to database artifacts of a selected type.

8. The computer program product of claim 1, wherein the at least one database artifact comprises a plurality of database artifacts, and further wherein the at least one selectable parameter value applies to all of the plurality of database artifacts.

9. The computer program product of claim 1, wherein the at least one database artifact comprises a plurality of database artifacts, each classified as a type of corresponding types of artifact conversion processes, and the operations further comprise:
    checking applicability of the at least one selectable parameter value, in order, with respect to a corresponding parameter of a single database artifact, a corresponding parameter of all database artifacts associated with a type of artifact conversion process, or a corresponding parameter of all of the plurality of database artifacts;
    applying the selectable parameter value and ceasing further applicability checking when applicability is found; and
    applying a default parameter value when no applicability is found.

10. The computer program product of claim 1, wherein the plurality of deployment procedures comprises at least one call to a called program, and the at least one selectable parameter value is included within the at least one call and defines a storage location for a trace message to be written by the called program logging a result of an execution of the at least one call by the called program.

11. A computer-implemented method, the method comprising:
    determining, by one or more processors, at least one database artifact of a plurality of artifacts, the at least one database artifact specifying at least one database object to be deployed within a database system using at least one deployment procedure of a plurality of deployment procedures that are executable in an order defined by a dependency graph;

receiving, by the one or more processors, at least one selectable parameter value for at least one deployment procedure parameter for the at least one deployment procedure of the plurality of deployment procedures; and executing, by the one or more processors, the plurality of deployment procedures, in the order defined by the dependency graph, using the at least one selectable parameter value for the at least one deployment procedure parameter of the at least one deployment procedure, to thereby deploy the at least one database object into the database system.

12. The computer-implemented method of claim 11, wherein the at least one database artifact provides a declarative description of the at least one database object, and the plurality of deployment procedures are configured to convert the at least one database artifact into the at least one database object comprising at least one executable database object.

13. The computer-implemented method of claim 11, wherein the plurality of deployment procedures govern conversion of the at least one database artifact into the at least one database object and any associated interaction with the database system.

14. The computer-implemented method of claim 11, further comprising:
  storing the at least one selectable parameter value in a parameter table; and
  retrieving, during the execution of a corresponding deployment procedure of the plurality of deployment procedures, the at least one selectable parameter value from the parameter table for use in the execution of the corresponding deployment procedure.

15. The computer-implemented method of claim 11, wherein the at least one database artifact comprises a plurality of database artifacts, each classified as a type of corresponding types of artifact conversion processes, and further wherein the at least one selectable parameter value applies to database artifacts of a selected type.

16. The computer-implemented method of claim 11, wherein the at least one database artifact comprises a plurality of database artifacts, and further wherein the at least one selectable parameter value applies to all of the plurality of database artifacts.

17. The computer-implemented method of claim 11, wherein the plurality of deployment procedures comprises at least one call to a called program, and the at least one selectable parameter value is included within the at least one call and defines a storage location for a trace message to be written by the called program logging a result of an execution of the at least one call by the called program.

18. A system comprising:
at least one processor; and
one or more computer memory devices interoperably coupled with the one or more computers and having tangible, non-transitory, machine-readable media storing one or more instructions that, when executed by the one or more computers, perform one or more operations comprising:
  determining at least one database artifact of a plurality of artifacts, the at least one database artifact specifying at least one database object to be deployed within a database system using at least one deployment procedure of a plurality of deployment procedures that are executable in an order defined by a dependency graph;
  receiving at least one selectable parameter value for at least one deployment procedure parameter for the at least one deployment procedure of the plurality of deployment procedures; and
  executing the plurality of deployment procedures, in the order defined by the dependency graph, using the at least one selectable parameter value for the at least one deployment procedure parameter of the at least one deployment procedure, to thereby deploy the at least one database object into the database system.

19. The system of claim 18, wherein the at least one database artifact provides a declarative description of the at least one database object, and the plurality of deployment procedures are configured to convert the at least one database artifact into the at least one database object comprising at least one executable database object and wherein the plurality of deployment procedures govern conversion of the at least one database artifact into the at least one database object and any associated interaction with the database system.

20. The system of claim 18, wherein the operations further comprise:
  storing the at least one selectable parameter value in a parameter table; and
  retrieving, during the execution of a corresponding deployment procedure of the plurality of deployment procedures, the at least one selectable parameter value from the parameter table for use in the execution of the corresponding deployment procedure.

* * * * *